(12) United States Patent
Hoscheit et al.

(10) Patent No.: US 10,824,729 B2
(45) Date of Patent: Nov. 3, 2020

(54) COMPLIANCE MANAGEMENT IN A LOCAL NETWORK

(71) Applicant: Tanium Inc., Emeryville, CA (US)

(72) Inventors: James B. Hoscheit, Gallatin, TN (US); Kevin N. Smathers, Fuquay-Varina, NC (US); Connor J. Hindley, Durham, NC (US); Christian L. Hunt, Chapel Hill, NC (US)

(73) Assignee: TANIUM INC., Emeryville, CA (US)

( * ) Notice: Subject to any disclaimer, the term of this patent is extended or adjusted under 35 U.S.C. 154(b) by 281 days.

(21) Appl. No.: 16/033,131

(22) Filed: Jul. 11, 2018

(65) Prior Publication Data

US 2019/0018965 A1    Jan. 17, 2019

Related U.S. Application Data

(60) Provisional application No. 62/532,918, filed on Jul. 14, 2017.

(51) Int. Cl.
*G06F 21/57* (2013.01)
*H04L 29/06* (2006.01)
(Continued)

(52) U.S. Cl.
CPC .......... *G06F 21/57* (2013.01); *G06F 11/0793* (2013.01); *G06F 11/3428* (2013.01);
(Continued)

(58) Field of Classification Search
CPC .. G06F 11/0793; G06F 11/3428; G06F 21/57; H04L 41/12; H04L 41/0853;
(Continued)

(56) References Cited

U.S. PATENT DOCUMENTS 5,220,596 A   6/1993  Patel
5,842,202 A   11/1998 Kon
(Continued)

FOREIGN PATENT DOCUMENTS

EP   1553747 A1   7/2005
EP   2493118 A1   8/2012

OTHER PUBLICATIONS

Hunt, Notice of Allowance dated Jan. 24, 2019, U.S. Appl. No. 15/215,468, 8 pgs.
(Continued)

*Primary Examiner* — Azizul Choudhury
(74) *Attorney, Agent, or Firm* — Morgan, Lewis & Bockius LLP

(57) ABSTRACT

A local environment verification method, performed by a server of a computer network, includes injecting, into a linear communication orbit, a bundle of information items regarding deployment of a respective local environment verification framework at each of a first subset of nodes in the computer network. The bundle of information items is distributed to a respective node of the first subset of nodes through the linear communication orbit, and used to establish the respective local environment verification framework at the respective node of the first subset of nodes. The respective node of the first subset of nodes is configured to perform a set of local environment verifications using the respective local environment verification framework. The method further includes injecting, into the linear communication orbit, a query message to collect respective local results of the set of local environment verifications from the first subset of nodes.

63 Claims, 20 Drawing Sheets

(51) Int. Cl.
*G06F 11/34* (2006.01)
*H04L 12/24* (2006.01)
*H04L 29/08* (2006.01)
*G06F 11/07* (2006.01)

(52) U.S. Cl.
CPC ...... *H04L 41/0853* (2013.01); *H04L 41/0866* (2013.01); *H04L 41/12* (2013.01); *H04L 63/1408* (2013.01); *H04L 63/1433* (2013.01); *H04L 67/34* (2013.01); *H04L 67/10* (2013.01)

(58) Field of Classification Search
CPC .............. H04L 41/0866; H04L 63/1408; H04L 63/1433; H04L 37/10; H04L 37/34
See application file for complete search history.

(56) References Cited

U.S. PATENT DOCUMENTS

| | | |
|---|---|---|
| 5,949,755 A | 9/1999 | Uphadya et al. |
| 6,049,828 A | 4/2000 | Dev et al. |
| 6,615,213 B1 * | 9/2003 | Johnson ............... H04L 29/06 709/217 |
| 6,879,979 B2 | 4/2005 | Hindawi et al. |
| 6,885,644 B1 | 4/2005 | Knop et al. |
| 7,043,550 B2 | 5/2006 | Knop et al. |
| 7,120,693 B2 | 10/2006 | Chang et al. |
| 7,240,044 B2 | 7/2007 | Chaudhuri et al. |
| 7,299,047 B2 | 11/2007 | Dolan et al. |
| 7,555,545 B2 | 6/2009 | McCasland |
| 7,600,018 B2 | 10/2009 | Maekawa et al. |
| 7,698,453 B2 | 4/2010 | Samuels et al. |
| 7,720,641 B2 | 5/2010 | Alagappan et al. |
| 7,761,557 B2 | 7/2010 | Fellenstein et al. |
| 7,769,848 B2 | 8/2010 | Choy et al. |
| 7,844,687 B1 | 11/2010 | Gelvin et al. |
| 8,078,668 B2 | 12/2011 | Moreau |
| 8,086,729 B1 | 12/2011 | Hindawi et al. |
| 8,139,508 B1 | 3/2012 | Roskind |
| 8,185,612 B1 | 5/2012 | Arolovitch et al. |
| 8,185,615 B1 | 5/2012 | McDysan et al. |
| 8,271,522 B2 | 9/2012 | Mehul et al. |
| 8,392,530 B1 | 3/2013 | Manapragada et al. |
| 8,477,660 B2 | 7/2013 | Lee et al. |
| 8,504,879 B2 | 8/2013 | Poletto et al. |
| 8,510,562 B2 | 8/2013 | Ramakrishnan et al. |
| 8,813,228 B2 | 8/2014 | Magee et al. |
| 8,885,521 B2 | 11/2014 | Wang et al. |
| 8,903,973 B1 | 12/2014 | Hindawi et al. |
| 8,904,039 B1 | 12/2014 | Hindawi et al. |
| 9,009,827 B1 | 4/2015 | Albertson et al. |
| 9,059,961 B2 | 6/2015 | Hindawi et al. |
| 9,246,977 B2 | 1/2016 | Hindawi et al. |
| 9,609,007 B1 | 3/2017 | Rivlin et al. |
| 9,667,738 B2 | 5/2017 | Hindawi et al. |
| 9,716,649 B2 | 7/2017 | Bent et al. |
| 9,769,037 B2 | 9/2017 | Hindawi et al. |
| 9,800,603 B1 | 10/2017 | Sidagni et al. |
| 9,985,982 B1 | 5/2018 | Bartos et al. |
| 10,095,864 B2 | 10/2018 | Hunt et al. |
| 10,136,415 B2 | 11/2018 | Hindawi et al. |
| 2001/0056461 A1 | 12/2001 | Kampe et al. |
| 2002/0007404 A1 | 1/2002 | Vange et al. |
| 2002/0042693 A1 | 4/2002 | Kampe et al. |
| 2002/0073086 A1 | 6/2002 | Thompson et al. |
| 2002/0198867 A1 | 12/2002 | Lohman et al. |
| 2003/0101253 A1 | 5/2003 | Saito et al. |
| 2003/0131044 A1 | 7/2003 | Nagendra et al. |
| 2003/0212676 A1 | 11/2003 | Bruce et al. |
| 2003/0212821 A1 | 11/2003 | Gillies et al. |
| 2004/0076164 A1 | 4/2004 | Vanderveen et al. |
| 2004/0190085 A1 | 9/2004 | Silverbrook et al. |
| 2005/0004907 A1 | 1/2005 | Bruno et al. |
| 2005/0108356 A1 | 5/2005 | Rosu et al. |
| 2005/0108389 A1 | 5/2005 | Kempin et al. |
| 2005/0195755 A1 | 9/2005 | Senta et al. |
| 2006/0039371 A1 | 2/2006 | Castro et al. |
| 2006/0128406 A1 | 6/2006 | Macartney |
| 2007/0005738 A1 | 1/2007 | Alexion-Tiernan et al. |
| 2007/0211651 A1 | 9/2007 | Ahmed et al. |
| 2007/0230482 A1 | 10/2007 | Shim et al. |
| 2008/0082628 A1 | 4/2008 | Rowstron et al. |
| 2008/0133582 A1 | 6/2008 | Andersch et al. |
| 2008/0258880 A1 | 10/2008 | Smith et al. |
| 2008/0263031 A1 | 10/2008 | George et al. |
| 2008/0288646 A1 | 11/2008 | Hasha et al. |
| 2009/0125639 A1 | 5/2009 | Dam et al. |
| 2009/0271360 A1 | 10/2009 | Bestgen et al. |
| 2009/0319503 A1 | 12/2009 | Mehul et al. |
| 2009/0328115 A1 | 12/2009 | Malik |
| 2010/0070570 A1 | 3/2010 | Lepeska |
| 2010/0085948 A1 | 4/2010 | Yu et al. |
| 2010/0094862 A1 | 4/2010 | Bent et al. |
| 2010/0296416 A1 | 11/2010 | Lee et al. |
| 2010/0306252 A1 | 12/2010 | Jarvis et al. |
| 2011/0231431 A1 | 9/2011 | Kamiwada et al. |
| 2011/0271319 A1 | 11/2011 | Venable, Sr. |
| 2012/0269096 A1 | 10/2012 | Roskind |
| 2013/0110931 A1 | 5/2013 | Kim et al. |
| 2013/0170336 A1 | 7/2013 | Chen et al. |
| 2013/0276053 A1 | 10/2013 | Hugard, IV et al. |
| 2014/0075505 A1 | 3/2014 | Subramanian |
| 2014/0101133 A1 | 4/2014 | Carston et al. |
| 2014/0149557 A1 | 5/2014 | Lohmar et al. |
| 2014/0164552 A1 | 6/2014 | Kim et al. |
| 2014/0181295 A1 | 6/2014 | Hindawi et al. |
| 2014/0244727 A1 | 8/2014 | Kang et al. |
| 2014/0280280 A1 | 9/2014 | Singh |
| 2014/0375528 A1 | 12/2014 | Ling |
| 2015/0080039 A1 | 3/2015 | Ling et al. |
| 2015/0149624 A1 | 5/2015 | Hindawi et al. |
| 2015/0163121 A1 | 6/2015 | Mahaffey et al. |
| 2015/0172228 A1 | 6/2015 | Zalepa et al. |
| 2015/0256575 A1 | 9/2015 | Scott |
| 2015/0372911 A1 * | 12/2015 | Yabusaki ................ H04L 45/74 709/226 |
| 2015/0373043 A1 | 12/2015 | Wang et al. |
| 2016/0080408 A1 | 3/2016 | Colelman et al. |
| 2016/0119251 A1 | 4/2016 | Solis et al. |
| 2016/0269434 A1 | 9/2016 | DiValentin et al. |
| 2016/0286540 A1 | 9/2016 | Hindawi et al. |
| 2016/0352588 A1 | 12/2016 | Subbarayan et al. |
| 2016/0360006 A1 | 12/2016 | Hopkins et al. |
| 2017/0118074 A1 | 4/2017 | Feinstein et al. |
| 2018/0039486 A1 | 2/2018 | Kulkami et al. |
| 2018/0074796 A1 | 3/2018 | Alabes et al. |
| 2018/0191747 A1 | 7/2018 | Nachenberg et al. |
| 2020/0053072 A1 | 2/2020 | Glozman et al. |

OTHER PUBLICATIONS

Hunt, Notice of Allowance dated Apr. 1, 2019, U.S. Appl. No. 15/215,468, 8 pgs.
Hunt, Final Office Action dated Apr. 1, 2019, U.S. Appl. No. 15/215,474, 7 pgs.
Google, Notice of Allowance, U.S. Appl. No. 15/713,518, dated Apr. 10, 2019, 14 pgs.
Abdalkarim Awad et al., Virtual Cord Protocol (VCP): a Flexible DHT-like Routing Service for Sensor Networks, In Proceedings of the 5th IEEE International Conference on Mobile Ad Hoc and Sensor Systems, 2008, 10 pgs. 133-142.
Jae Woo Lee et al., 0 to 10k in 20 seconds: Bootstrapping Large-Scale DHT networks, 2011 IEEE International Conference on Communications, Jun. 9, 2011, pp. 1-6.
Hindawi, Office Action, U.S. Appl. No. 15/702,617, dated Jun. 1, 2018, 37 pgs.
Hindawi, Final Office Action, U.S. Appl. No. 15/702,617, dated Dec. 27, 2018, 54 pgs.
Hood, Proactive Network-Fault Detection, Sep. 1997, 9 pages.
Hunt, Office Action dated Oct. 4, 2018, U.S. Pat. No./215,468, 13 pgs.
Hunt, Office Action dated Sep. 10, 2018, U.S. Pat. No./215,474, 10 pgs.

(56) References Cited

OTHER PUBLICATIONS

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.

Rao et al., "Optimal Resource Placement in Structured Peer-to-Peer Networks," Jul. 2010, IEEE Transactions on Parallel and Distributed Systems, vol. 21, No. 7, 16 pgs.

Stoica, I., et al., "Chord: A Scalable Peer-to-Peer Lookup Service for Internet Applications," SIGCOMM '01, Aug. 27-31, 2001, San Diego, California, 12 pages.

Tanium Inc, International Search Report and Written Opinion, PCT/US2013/076971, dated Apr. 4, 2014, 19 pgs.

Tanium Inc, International Preliminary Report on Patentability, PCT/US2013/076971, dated Jun. 23, 2015, 14 pgs.

Tanium Inc, International Search Report and Written Opinion, PCT/US2014/067607, dated Feb. 18, 2015, 15 pgs.

Tanium Inc, International Preliminary Report on Patentability, PCT/US2014/067607, dated May 31, 2016, 11 pgs.

Tanium Inc, International Search Report and Written Opinion, PCT/US2015/020780, dated Jul. 2, 2015, 14 pgs.

Tanium Inc, International Preliminary Report on Patentability, PCT/US2015/0020780, dated Sep. 27, 2016, 9 pgs.

Weixiong Rao et al, "Optimal Resource Placement in Structured Peer-to-Peer Networks," IEEE Transactions on Parallel and Distributed Systems, vol. 21, No. 7, Jul. 2010, 16 pgs.

Lippincott, Notice of Allowance, U.S. Appl. No. 15/878,286, dated Apr. 25, 2019, 9 pgs.

Jae Woo Lee, Henning Schulzrinne, Wolfgang Kellerer and Zoran Despotovic, 0 to 10k in 20 Seconds: Bootstrapping Large-Scale DHT Networks, pp. 1-6, Jun. 9, 2011 (Year: 2011).

Ion Stoica, Robert Morris, David Karger, M. Frans Kaashoek, Hari Balakrishnan, Chord: A Scalable Peertopeer Lookup Service for Internet Applications, 2001, pp. 1-12 (Year: 2002).

Ping Wang, Baber Aslann, Cliff C. Zou, Peer-to-Peer Botnets: The Next Generation of Botnet Attacks, Jan. 2010, pp. 1-25 (Year: 2010).

Sean Rhea, Dennis Geels, Timothy Roscoe, and John Kubiatowicz, Handling Churn in a DHT, 2004, pp. 1-14 (Year: 2004).

\* cited by examiner

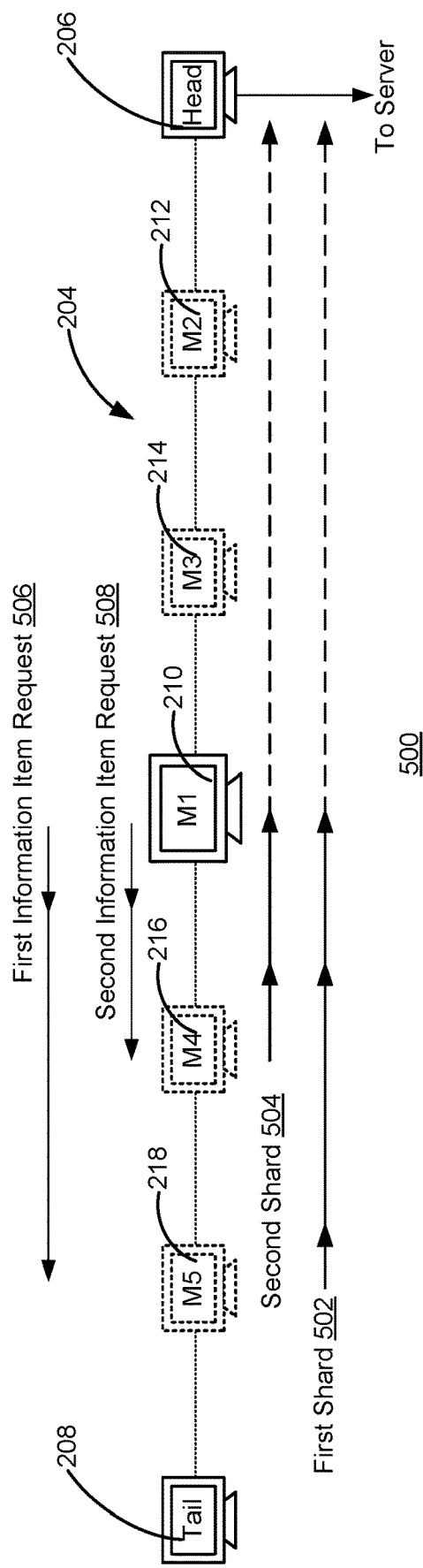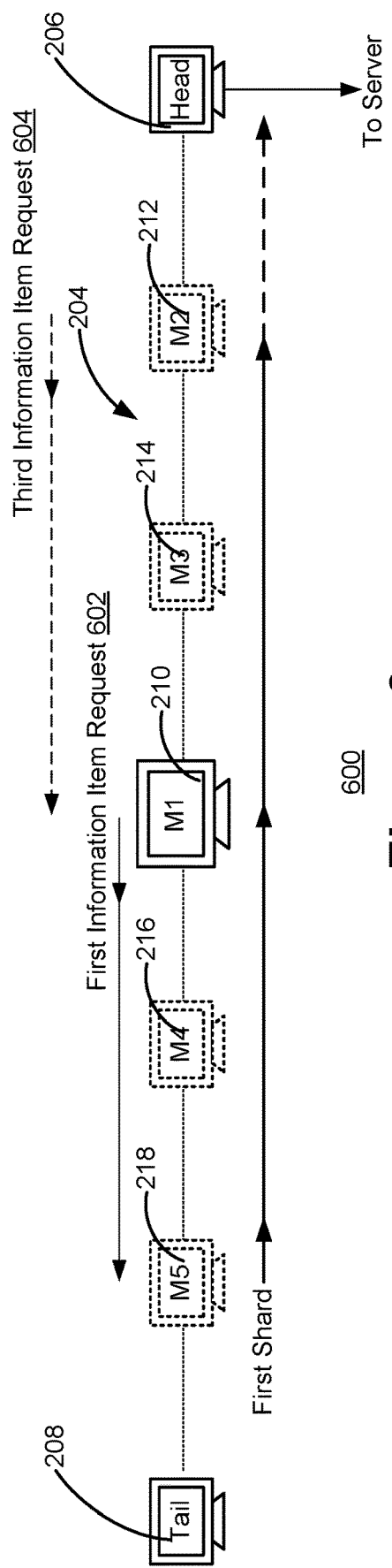
Figure 5
Figure 6

900

Create Deployment

| | |
|---|---|
| Description: | [ ] |
| Platform: | Windows ▼ — 902 |
| Architecture: | All ▼ — 904 |
| Compliance Engine: | Select Engines... — 906 |
| Computer Groups: | Select Computer Groups... — 908 |
| Start at: ☐ | Date / Time — 910 |
| End at: ☐ | Date / Time — 912 |
| Distribute Over: ■ | 15 / Minutes ▼ — 914 |
| Reissue Every: ■ | 6 / Hours ▼ — 916 |

— 918

[ Create & Deploy ]  [ Close ]

Figure 9

At a server of a computer network that has a plurality of nodes:

Injecting, into the linearly ordered communication orbit, a bundle of information items regarding deployment of a respective local environment verification framework at each of a first subset of nodes in the computer network ⟶ 1102

(A)

The bundle of information items regarding deployment of the respective local environment verification framework includes a plurality of compliance benchmarks and an engine for executing the plurality of compliance benchmarks ⟶ 1110

Sending a verification request to perform the first set of local environment verifications at the first subset of nodes, wherein the verification request includes one or more parameters for performing the first set of local environment verifications at the first subset of nodes ⟶ 1112

The one or more parameters include one or more of: ⟶ 1114
 a selection of the first set of local environment verifications from a full set of local environment verifications included in the bundle of information items,
 a schedule by which the first set of local environment verifications is to be executed at the first subset of nodes,
 a time interval during which the first set of local environment verifications is to be completed at the first subset of nodes, and
 a batch size for running the first set of local environment verifications at a time.

At a server of a computer network that has a plurality of nodes:

1102 — Injecting, into the linearly ordered communication orbit, a bundle of information items regarding deployment of a respective local environment verification framework at each of a first subset of nodes in the computer network (B)

1116 — Receiving a first instruction to deploy a local environment verification action to implement the first set of local environment verifications at the first subset of nodes, wherein the server assembles the bundle of information items to injected into the linearly ordered communication orbit 1118 — The first instruction specifies a first time interval during which to distribute the bundle of information items to the first subset of nodes 1120 — The first instruction specifies a second time interval for re-deploying the respective local environment verification framework at each of the first subset of nodes 1122 — The first instruction specifies one or more characteristics for dynamically identifying the first subset of nodes, and the respective node of the subset of nodes self-identifies as belonging to the first subset of nodes based on the one or more characteristics (C)

At a server of a computer network that has a plurality of nodes:

(E)

- Injecting, into the linearly ordered communication orbit, a second query message to request performance of the one or more custom verifications at the first subset of nodes — 1150
  - The second instruction includes one or more custom verifications that are to be performed at the first subset of nodes — 1148
  - The second query message is forwarded from node to node along the linear communication orbit — 1152
  - The respective node of the first subset of nodes, in response to receiving the second query message through the linear communication orbit, performs the one or more custom verifications; the respective node sends respective local results for the one or more custom verifications that have been obtained at said respective node to the server through the linear communication orbit — 1154

- The bundle of information items includes a plurality of rules of the local environment verification framework, the second instruction includes an identifier mapping that maps first identifiers of the plurality of rules to second identifiers of the plurality of rules — 1156
  - Generating a first report that includes the first identifiers of the plurality of rules — 1158
  - Generating a second report that includes the second identifiers of the plurality of rules — 1160

- Receiving a third instruction to issue a remedial action command to the respective node of the first subset of nodes — 1162
- Sending the remediation action command to the respective node of the first subset of nodes through the linearly ordered communication orbit — 1164

At a server of a computer network that has a plurality of nodes:

(F)

─ 1166
Receiving verification status data from the first subset of nodes through the linearly ordered communication orbit, wherein the verification status data includes respective messages from one or more nodes in the first subset of nodes indicating completion status of the first set of local environment verifications at said one or more nodes ─ 1168
In accordance with the received verification status data, providing real-time action progress updates to a user ─ 1170
Receiving an instruction to collect recent results for the first set of local environment verifications from the first subset of nodes ─ 1172
In response to receiving the instruction to collect the recent results, sending a third query message along the linearly ordered communication orbit to collect the recent results from the first subset of nodes ─ 1174
In accordance with a determination that cached results for the first set of local environment verifications meet predefined age criteria, the respective node of the first subset of nodes sends the cached results to the server through the linearly ordered communication orbit 1100 (Continued)

Figure 11G

COMPLIANCE MANAGEMENT IN A LOCAL NETWORK

RELATED APPLICATIONS

This application claims priority to U.S. Provisional Application No. 62/532,918, filed Jul. 14, 2017, which is hereby incorporated by reference in its entirety.

This application is related to U.S. patent application Ser. No. 14/554,739, filed Nov. 26, 2014, which claims priority to U.S. Provisional Application No. 61/969,711, filed Mar. 24, 2014, both of which are hereby incorporated by reference in their entireties.

This application is related to U.S. patent application Ser. No. 14/554,711, filed Nov. 26, 2014, now U.S. Pat. No. 9,667,738, which claims priority to U.S. Provisional Application No. 61/969,708, filed Mar. 24, 2014, both of which are hereby incorporated by reference in their entireties.

This application is related to U.S. patent application Ser. No. 13/797,962, filed Mar. 12, 2013, titled "Creation and Maintenance of Self-Organizing Communication Orbits in Distributed Network," now U.S. Pat. No. 9,059,961, which claims priority to U.S. Provisional Application Ser. No. 61/745,236, filed Dec. 21, 2012, titled "System and Network Management Using Self-Organizing Communication Orbits in Distributed Networks," and U.S. Provisional Application Ser. No. 61/774,106, filed Mar. 7, 2013, titled "System, Security and Network Management Using Self-Organizing Communication Orbits in Distributed Networks," the entireties of which are hereby incorporated by reference.

This application is also related to U.S. patent application Ser. No. 12/412,623, filed Mar. 27, 2009, now U.S. Pat. No. 8,086,729, titled "Distributed Statistical Detection of Network Problems and Causes," which claims priority to U.S. Provisional Application No. 61/113,060, filed Nov. 10, 2008, U.S. patent application Ser. No. 13/084,923, filed Apr. 12, 2011, titled "Large-Scale Network Querying and Reporting," now U.S. Pat. No. 8,904,039, and U.S. patent application Ser. No. 13/107,625, filed May 13, 2011, titled "Parallel Distributed Network Management," now U.S. Pat. No. 8,903,793. Content of each of the above applications is hereby incorporated by reference in its entirety.

BACKGROUND

There are many circumstances in which multiple computational machines (sometimes called computers) on the same local area network (LAN) need to execute local environment verification frameworks for checking their respective performance and vulnerability. Execution of the local environment verification frameworks oftentimes makes heavy use of both hardware (distributed file servers) and wide area network (WAN) bandwidth, for example, by having each computational machine on the local area network separately obtain a copy of a local environment verification framework from a resource external to the local area network and separately report verification results to a remote administrator machine. It would be beneficial to have a more efficient local environment verification mechanism than the current practice.

SUMMARY

In one aspect, a method is performed at a server of a computer network that has a plurality of nodes. Each said node includes a respective computational device and has a respective defined location in a linear communication orbit (also called "linearly ordered communication orbit") including said plurality of nodes. The method includes injecting, into the linear communication orbit, a bundle of information items regarding deployment of a respective local environment verification framework at each of a first subset of nodes in the computer network. The bundle of information items is distributed to a respective node of the first subset of nodes through the linear communication orbit. The respective local environment verification framework is established at the respective node of the first subset of nodes in accordance with the bundle of information items that is distributed to said respective node. The respective node of the first subset of nodes performs a first set of local environment verifications using the respective local environment verification framework that has been established at said respective node. The method further includes injecting, into the linear communication orbit, a query message to collect respective local results of the first set of local environment verifications from the first subset of nodes. The query message is forwarded from node to node along the linear communication orbit. In response to receiving the query message through the linear communication orbit, the respective node of the first subset of nodes sends the respective local results of the first set of local environment verifications that have been obtained at said respective node to the server through the linear communication orbit.

In some embodiments, the bundle of information items regarding deployment of the respective local environment verification framework includes a plurality of compliance benchmarks and an engine for executing the plurality of compliance benchmarks. Further, in some embodiments, the plurality of compliance benchmarks are associated with a plurality of rules, and the bundle of information items include the plurality of rules. The method includes mapping first identifiers of the plurality of rules to second identifiers of the plurality of rules. In some embodiments, the method further includes generating a first report that includes the first identifiers of the plurality of rules, and/or generating a second report that includes the second identifiers of the plurality of rules.

In some embodiments, the method further includes after deployment of the local environment verification framework, and prior to injecting the query message, sending a verification request to perform the first set of local environment verifications at the first subset of nodes. The verification request includes one or more parameters for performing the first set of local environment verifications at the first subset of nodes. Further, in some embodiments, the one or more parameters include one or more of: a selection of the first set of local environment verifications from a full set of local environment verifications included in the bundle of information items, a schedule by which the first set of local environment verifications is to be executed at the first subset of nodes, a time interval during which the first set of local environment verifications is to be completed at the first subset of nodes, and a batch size for running the first set of local environment verifications at a time.

In some embodiments, the method further includes receiving a first instruction to deploy a local environment verification action to the first subset of nodes. The server assembles the bundle of information items injected into the linear communication orbit. Further, in some embodiments, the first instruction specifies a first time interval during which to distribute the bundle of information items to the first subset of nodes. In some embodiments, the first instruction specifies a second time interval for re-deploying the respective local environment verification framework at each of the first subset of nodes. In some embodiments, the first instruction specifies one or more characteristics for dynamically identifying the first subset of nodes, and the respective node of the subset of nodes self-identifies as belonging to the first subset of nodes based on the one or more characteristics.

In some embodiments, injecting the bundle of information items into the linear communication orbit includes: dividing the bundle of information items into a plurality of file shards from which the bundle of information items are restorable and sending the plurality of file shards to a selected node in the linear communication orbit. In addition, in some embodiments, one or more copies of each file shard of the plurality of file shards are propagated from node to node along the linear communication orbit while the bundle of information items are being distributed to the first subset of nodes. In some embodiments, the respective node of the first subset of nodes assembles the plurality of file shards into the bundle of information items after receiving each of the plurality of file shards through the linear communication orbit.

In some embodiments, the method further includes receiving deployment status data from the first subset of nodes through the linear communication orbit, and in accordance with the received deployment status data, providing deployment progress updates to a user. The deployment status data includes respective messages from one or more nodes in the first subset of nodes indicating establishment of the respective local environment verification framework at said one or more nodes.

In some embodiments, the method further includes receiving a second instruction to generate a report regarding execution of a local environment verification action at the first subset of nodes. The server injects the query message into the linear communication orbit in accordance with the second instruction. Further, in some embodiments, the second instruction specifies a second time interval for reissuing the query message to collect the respective local results of the first set of local environment verifications from the first subset of nodes. In some embodiments, the method further includes providing a report on the local results of the execution of the first set of local environment verifications at the first subset of nodes to a user.

Additionally, in some embodiments, the second instruction includes one or more custom verifications that are to be performed at the first subset of nodes. The method further includes injecting, into the linear communication orbit, a second query message to request execution of the one or more custom verifications at the first subset of nodes. The second query message is forwarded from node to node along the linear communication orbit, and the respective node of the first subset of nodes, in response to receiving the second query message through the linear communication orbit, performs the one or more custom verifications. In some embodiments, the respective node stores the local results for the one or more custom verifications as cached results, and sends the local results for the one or more custom verifications in response to a subsequent query. In another example, local results for the one or more custom verifications are both generated and returned in response to the second query.

Further, in some embodiments, the second instruction includes an identifier mapping that maps first identifiers of the first subset of nodes to second identifiers of the first subset of nodes. In some embodiments, the method further includes generating a first report that includes the first identifiers of the first subset of nodes, and generating a second report that includes the second identifiers of the first subset of nodes.

In some embodiments, the method further includes receiving a third instruction to issue a remedial action command to the respective node of the first subset of nodes, and sending the remediation action command to the respective node of the first subset of nodes through the linear communication orbit.

In some embodiments, the method further includes receiving verification status data from the first subset of nodes through the linear communication orbit. The verification status data includes respective messages from one or more nodes in the first subset of nodes indicating completion status of the first set of local environment verifications at said one or more nodes. The method further includes in accordance with the received verification status data, providing action progress updates to a user. In some situations, the action progress updates are provided to the user in real time.

In some embodiments, the method includes receiving an instruction to collect recent results for the first set of local environment verifications from the first subset of nodes, and in response to receiving the instruction to collect the recent results, sending a third query message along the linear communication orbit to collect the recent results from the first subset of nodes. In accordance with a determination that cached results for the first set of local environment verifications meet predefined age criteria, the respective node of the first subset of nodes sends the cached results to the server through the linear communication orbit.

In another aspect of the invention, a non-transitory computer-readable medium, having instructions stored thereon, which when executed by one or more processors cause the processors of a server of a computer network to perform operations including injecting, into a linear communication orbit, a bundle of information items regarding deployment of a respective local environment verification framework at each of a first subset of nodes in the computer network. The computer network has a plurality of nodes, and each node includes a respective computational device and has a respective defined location in the linear communication orbit including said plurality of nodes. The bundle of information items is distributed to a respective node of the first subset of nodes through the linear communication orbit. The respective local environment verification framework is established at the respective node of the first subset of nodes in accordance with the bundle of information items that is distributed to said respective node. The respective node of the first subset of nodes is configured to perform a first set of local environment verifications using the respective local environment verification framework that has been established at said respective node. The instructions stored in the non-transitory computer-readable medium of the server, when executed by one or more processors, cause the processors to further perform operations including injecting, into the linear communication orbit, a query message to collect respective local results of the first set of local environment verifications from the first subset of nodes. The query message is forwarded from node to node along the linear communication orbit. In response to receiving the query message through the linear communication orbit, the respective node of the first subset of nodes sends the respective local results of the first set of local environment verifications that have been obtained at said respective node to the server through the linear communication orbit.

In some embodiments, the instructions stored in the non-transitory computer-readable medium include instructions for causing the server of the computer network to perform the method of any of the methods described above.

In another aspect of the invention, a server of a computer network includes one or more processors, and memory having instructions stored thereon, which when executed by the one or more processors cause the server to perform operations including injecting, into a linear communication orbit, a bundle of information items regarding deployment of a respective local environment verification framework at each of a first subset of nodes in the computer network. The computer network has a plurality of nodes, and each node includes a respective computational device and has a respective defined location in the linear communication orbit including said plurality of nodes. The bundle of information items is distributed to a respective node of the first subset of nodes through the linear communication orbit. The respective local environment verification framework is established at the respective node of the first subset of nodes in accordance with the bundle of information items that is distributed to said respective node. The respective node of the first subset of nodes is configured to perform a first set of local environment verifications using the respective local environment verification framework that has been established at said respective node. The instructions stored in the memory of the server, when executed by one or more processors, cause the processors to further perform operations including injecting, into the linear communication orbit, a query message to collect respective local results of the first set of local environment verifications from the first subset of nodes. The query message is forwarded from node to node along the linear communication orbit. In response to receiving the query message through the linear communication orbit, the respective node of the first subset of nodes sends the respective local results of the first set of local environment verifications that have been obtained at said respective node to the server through the linear communication orbit.

In some embodiments, the instructions stored in the memory of the server of the computer network include instructions for causing the server to perform the method of any of the methods described above.

Other embodiments and advantages may be apparent to those skilled in the art in light of the descriptions and drawings in this specification.

BRIEF DESCRIPTION OF THE DRAWINGS

FIG. 5 illustrates an example process of providing file shards to a computational machine on a linear communication orbit in accordance with some embodiments.

FIG. 6 illustrates an example process of consolidating data requests issued by two distinct computational machines to request the same file shard for deploying a local environment verification framework on a linear communication orbit in accordance with some embodiments.

FIG. 9 is an example user interface displayed on an administrator machine for setting up deployment of a local environment verification framework on a linear communication orbit in accordance with some embodiments.

FIGS. 11A-11G include a flow diagram representing a method for verifying the local environments of nodes a computer network in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
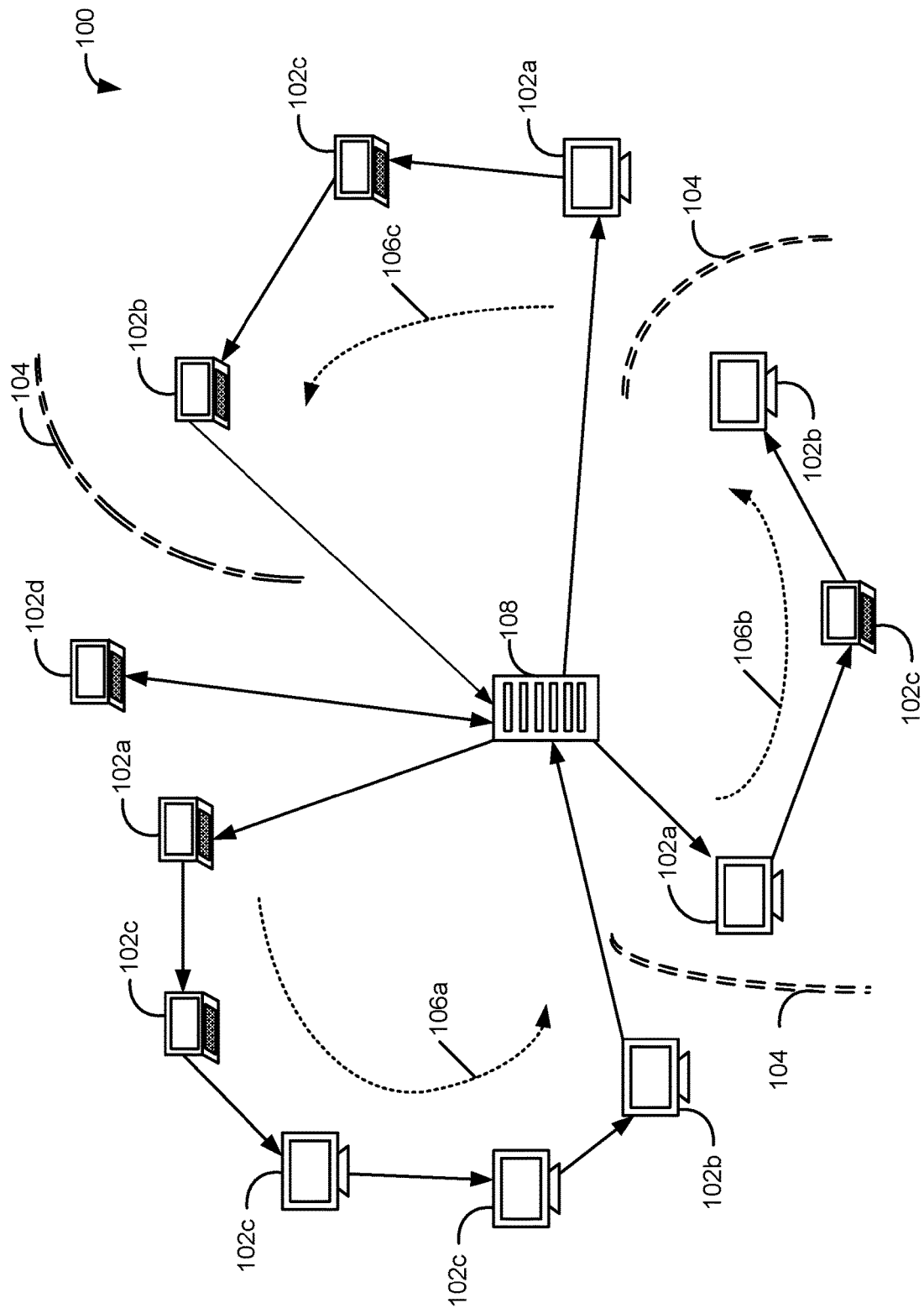
FIG. 1 illustrates a managed network comprising a plurality of interconnected machines, e.g., computers, servers, mobile devices, and other networked devices.

FIG. 1 illustrates a managed network 100 including a plurality of interconnected machines 102 (including 102a-d), e.g., computers, servers, mobile devices, and other networked devices. Examples of the managed network 100 include an enterprise network or another network under common management. The managed network 100 a plurality of sub-networks (e.g., contiguous segments 106), and optionally includes one or more singleton machine (e.g., singleton 102d). Each singleton or sub-network is coupled to a server 108 that facilitates creation, maintenance and operation of the respective singleton and sub-network. This server 108 may be elected automatically from among all or a subset of machines 102 according to various predetermined election rules implemented on machines 102. In some embodiments, server 108 is coupled to an administrator machine that presents user interfaces to allow an administrator user to provide instructions and receive feedback for identification, maintenance and operation of singleton machines and the creation, maintenance and operation of sub-networks of managed network 100. This administrator machine may also be elected automatically from all or a subset of machines 102 according to various predetermined election rules implemented on machines 102.

Each sub-network in managed network 100 includes at least two interconnected machines and adopts a certain network topology to organize these machines. Each singleton machine, if any, is a stand-alone node, except that it is coupled to server 108. In some embodiments, each singleton or sub-network is further separated from the rest of managed network 100 by one or more firewalls 104.

Optionally, machines 102 in managed network 100 are distributed across different geographical areas. Alternatively, machines 102 are located at the same physical location (e.g., the same building, or server farm). A respective machine 102 communicates with another machine 102 or the server 108 using one or more communication networks. Such communications include communications for performing normal operations (e.g., user-level operations, such as emailing, Internet browsing, VoIP, database accessing, etc.). The communication network(s) used can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like. In an example, two or more machines 102 in a sub-network are coupled via a wired connection, while at least some machines in the same sub-network are coupled via a Bluetooth PAN.

Machines 102 in managed network 100 are organized into one or more contiguous segments 106 (e.g., continuous segments 106a, 106b, 106c), each of which becomes a sub-network in managed network 100. The number of contiguous segments 106 in network 100 may vary greatly from one embodiment to another, and in some embodiments network 100 includes hundreds or thousands of contiguous segments 106.

In some embodiments, each contiguous segment 106 is a respective linear communication orbit that supports system, security and network management communications within the managed network 100. Furthermore, each contiguous segment 106 includes one head node (e.g., head node 102a), one tail node (e.g., tail node 102b), and a sequence of zero or more intermediate client nodes (e.g., intermediate node(s) 102c) in between the head node and the tail node. In some embodiments, both the head node and tail node of a contiguous segment 106a are coupled to server 108, while the intermediate nodes of contiguous segment 106a are not coupled to server 108. In some embodiments, only the head node of a contiguous segment 106b is coupled to the server 108, while the intermediate nodes and tail node are not coupled to the server 108.

In some embodiments, all machines 102 coupled to a linear communication orbit 106 in network 100 are sorted into an ordered sequence according to a respective unique identifier associated with each machine 102. For example, respective IP addresses of machines 102 are used to sort the machines into an ordered sequence in the linear communication orbit. Each machine is provided with a predetermined set of rules for identifying its own predecessor and/or successor nodes given the unique identifiers of its potential neighbor machines. When a machine joins or leaves the linear communication orbit, it determines its ordinal position relative to one or more other machines in the linear communication orbit according to the unique identifiers and the aforementioned rules. More details on how a linear communication orbit is organized and how each intermediate node, head node or end node enters and leaves the linear communication orbit are provided in the Applicants' prior application, U.S. patent application Ser. No. 13/797,962, filed Mar. 12, 2013, entitled "Creation and Maintenance of Self-Organizing Communication Orbits in Distributed Networks," which is hereby incorporated by reference in its entirety.

Linear communication orbits, such as exemplary linear communication orbits 106a-106c, are established and maintained to facilitate system, security and/or network management operations ascribed to manual and programmed administration of network 100. Examples of system, security and network management operations include: (1) collecting status information (e.g., bandwidth, load, availability, resource inventory, application status, machine type, date of last update, security breach, errors, etc.) from individual machines of the managed network; (2) issuance of system, security and network management commands (e.g., commands related to shutdown, restart, failover, release of resources, change access authorizations, backup, deployment, quarantine, load balancing, etc.) for individual resources and/or machines on the managed network; (3) file distribution, including software installations and updates; (4) detecting presence of particular malicious programs (e.g., viruses, malware, security holes, etc.) on individual machines on the managed network; (5) removal of or disabling particular malicious programs (e.g., viruses, malware, security holes, etc.) on individual machines on the managed network; (6) disabling or suspending suspicious or high-risk operations and activities (e.g., Internet or operating system activities of suspected virus, malware, etc.) on particular machines on the managed network; (7) detecting unmanaged machines coupled to the managed network; (8) detecting data leakage (e.g., transmission of classified information) from machines on the managed network to locations or machines outside of the managed network; (9) detecting connection or data transfer to/from removable data storage devices (e.g., memory stick, or other removable storage devices) from/to particular ports (e.g., a USB drive) of particular machines on the managed network. Other system, security and network management operations are possible, as will be apparent to those of ordinary skill in the art.

The present specification focuses on verifying local environments on individual computational machines 102 that are located at different client nodes of an established linear communication orbit. Such local environment verification operations include, for example, configuration compliance assessment, vulnerability scanning and management, and custom checks (e.g., checks on firewall, anti-virus capability, data encryption, governance, risk and compliance (GRC), etc.) within linear communication orbits 106a-106c. In an example, a local environment verification framework is deployed to a set of machines 102 on the linear communication orbits 106a-106c to verify enterprise-wide security configuration compliance. Optionally, the local environment verification framework includes standard security configuration benchmarks, such as those provided by Center for Internet Security (CIS), National Institute of Standards and Technology (NIST), Defense Information System Agency (DISA), International Organization for Standardization (ISO) and the International Electrotechnical Commission (IEC). These standard security configuration benchmarks fulfill system configuration hardening portions of some industry regulatory requirements, e.g., Payment Card Industry Data Security Standard (PCI DSS), Federal Information Security Management Act (FISMA), ISO/IEC 27002, Gramm-Leach-Bliley Act (GLBA), Sarbanes-Oxley Act of 2002 (SOX), and Health Insurance Portability and Accountability Act of 1996 (HIPAA). Alternatively, in some embodiments, these standard security configuration benchmarks are customized and augmented to meet specific internal requirements. When the standard or customized security configuration benchmarks are distributed to all or a subset of nodes on linear communication orbits 106a-106c, detailed endpoint assessment is implemented on selected machines 102 to meet specific external and internal requirements. Security configuration results of endpoint assessment can be automatically stored locally in the selected machines 102, and passed along linear communication orbits 106a-106c to return to a server 108 when a query message is received from server 108 to collect these security configuration results. In some embodiments, the security configuration results are aggregated and used to prepare for an audit to meet the external or internal security requirements.

Figure 2:
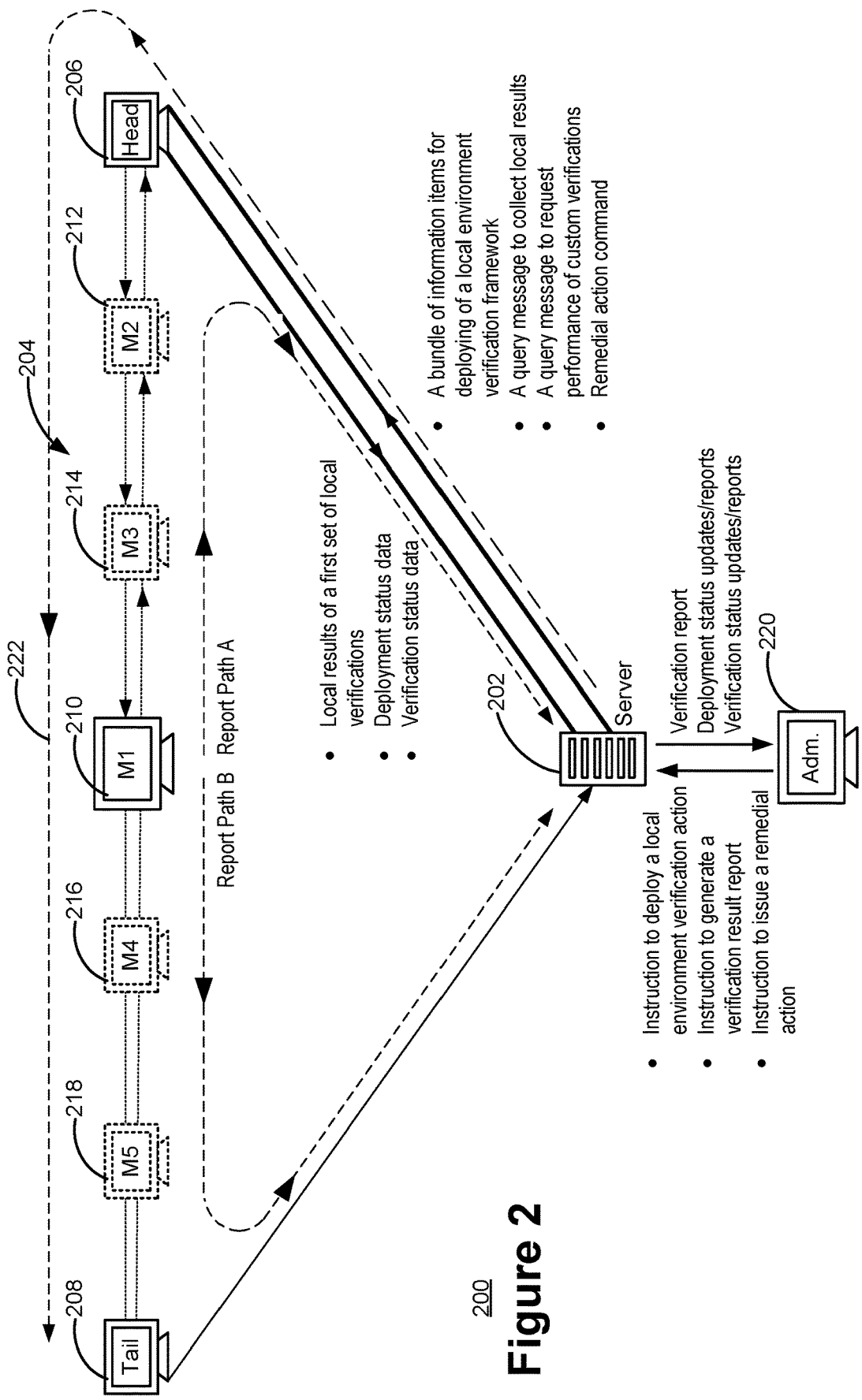
FIG. 2 illustrates an example local environment verification system 200 that deploys a local environment verification framework on a linear communication orbit in accordance with some embodiments.

FIG. 2 illustrates an example local environment verification system 200 that deploys a local environment verification framework on a linear communication orbit in accordance with some embodiments. The local environment verification system 200 includes a server 202 and a linear communication orbit 204 that are coupled at a head node 206. In addition to head node 206, the linear communication orbit 204 further includes a tail node 208 and a plurality of intermediate machines (e.g., machines M1-M5) 210-218 which are coupled between head node 206 and tail node 208. While intermediate machines 210-218 illustrate the configuration of linear communication orbit 204, in some embodiments, linear communication orbit 204 includes only one intermediate machine, while in other embodiments, it includes dozens, hundreds or even thousands of intermediate machines.

Server 202 injects into linear communication orbit 204 a bundle of information items regarding deployment of a respective local environment verification framework at each of a first subset of nodes (e.g., at computational machine (M1) 210). Optionally, the bundle of information items includes a package of files containing one or more of a runtime environment, engines, benchmarks and vulnerability checks. Specifically, in some embodiments, the local environment verification framework includes a compliance verification framework and/or a vulnerability detection framework, and the bundle of information items regarding deployment of such a local environment verification framework includes one or more of a Java runtime environment, a compliance verification engine, a set of compliance benchmarks, and/or vulnerability checks that are to be executed at a predefined group of nodes (e.g., the first subset of nodes) in linear communication orbit 204. More specifically, in an example, the bundle of information items includes a Java runtime environment and a compliance verification engine, while the compliance benchmarks or vulnerability checks are distributed on the linearly ordered communication orbit with a subsequent query message that is injected into the linearly ordered communication orbit for executing local environment checks on the local environment verification framework or collecting local results thereof.

The bundle of information items is distributed to a respective node of the first subset of nodes through linear communication orbit 204, thereby allowing establishment of the respective local environment verification framework at the respective node of the first subset of nodes. The respective node of the first subset of nodes is configured to perform a first set of local environment verifications using the respective local environment verification framework that has been at said respective node. In some embodiments, server 202 receives from an administrator machine 220 a first instruction to deploy the local environment verification action to the first subset of nodes in linear communication orbit 204, and the bundle of information items regarding deployment of the respective local environment verification framework are injected into the linear communication orbit 204 in accordance with the instruction to deploy the local environment verification action. In some situations, the first instruction includes a batch size for running the first set of local environment verifications at a time. Server 202 prepares a corresponding bundle of information items by gathering content related to the first set of local environment verifications according to the batch size, before deploying the bundle of information items to the first subset of nodes.

In some embodiments, computational machine (M1) 210 is an intermediate machine located between head node 206 and tail node 208 of linear communication orbit 204. The bundle of information items is initially received at head node 206 of linear communication orbit 204, and then passed along linear communication orbit 204 to each node in linear communication orbit 204 until it reaches tail node 208 of linear communication orbit 204. When the bundle of information items is distributed to each computational machine, the respective computational machine determines whether the local environment verification framework needs to be deployed locally. For example, when the bundle of information items is distributed to computational machine (M1) 210, computational machine (M1) 210 determines that the local environment verification framework needs to be deployed at computational machine (M1) 210, and as result (e.g., in accordance with that determination), caches a copy of the bundle of information items while passing the bundle of information items further along linear communication orbit 204. Computational machine (M1) 210 then establishes the local environment verification framework locally based on the cached bundle of information items, and prepares to perform a first set of local environment verifications using the local environment verification framework.

Specifically, computational machine (M1) 210 may obtain part or all of the bundle of information items from server 202 via head node 206 when the local environment verification framework is deployed by server 202. The bundle of information items is divided into a plurality of file shards from which the bundle of information items are restorable. Server 202 sends the plurality of file shards to linear communication orbit 204. One or more copies of each file shard of the plurality of file shards are propagated from node to node along linear communication orbit 204 while the bundle of information items are being distributed to the first subset of nodes. Computational machine M1 located at one of the first subset of nodes collects all or a subset of the plurality of file shards, and assembles the collected shards into the bundle of information items after receiving each of the plurality of file shards through linear communication orbit 204.

Alternatively, in some embodiments, computational machine (M1) 210 receives an instruction to deploy the local environment verification framework, and the instruction includes a command to collect and install the bundle of information items regarding deployment of a local environment verification framework within linear communication orbit 204. The instruction to deploy the local environment verification framework is initially received at head node 206 of linear communication orbit 204, and then passed along linear communication orbit 204 to each node in linear communication orbit 204 until it reaches tail node 208 of linear communication orbit 204. The instruction is interpreted by each computational machine (e.g., computational machine (M1) 210) in the orbit, which determines whether that machine should execute the command. Alternately stated, the instruction, when interpreted by each computational machine in the orbit, determines whether that machine needs to obtain and/or install the bundle of information items regarding deployment of the local environment verification framework. If the particular machine determines that it needs to obtain and/or install the bundle of information items, it generates a plurality of data requests to request a plurality of shards, as described in more detail below. Each of the data requests is a request for a respective shard within linear communication orbit 204. Together the shards form, or can be combined to form the bundle of information items regarding deployment of a local environment verification framework at the particular machine 102. More details on how a bundle of information items is obtained from a linear communication orbit are provided in the Applicants' prior applications, U.S. patent application Ser. No. 14/554,711, filed Nov. 26, 2014, entitled "Local Data Caching for Data Transfers on a Network of Computational Devices," and U.S. patent application Ser. No. 14/554,739, filed Nov. 26, 2014, entitled "Data Caching and Distribution in a Local Network," both of which are hereby incorporated by reference in their entireties.

In some embodiments, after the local environment verification framework is deployed, server 202 sends a verification request to perform the first set of local environment verifications at the first subset of nodes, and a local environment verification action is then executed to run the first set of local environment verifications at each of the first subset of nodes (e.g., computational machine (M1) 210) of linear communication orbit 204. The verification request includes one or more parameters for performing the first set of local environment verifications at the first subset of nodes. Specifically, in some embodiments, the one or more parameters include one or both of: a schedule by which the first set of local environment verifications is to be executed at the first subset of nodes, and a time interval during which the first set of local environment verifications is to be completed at the first subset of nodes. Further, in some implementations, the one or more parameters include one or both of a selection of the first set of local environment verifications from a full set of local environment verifications included in the bundle of information items, and a batch size indicating a number of verification operations in the first set of local environment verifications that are to be executed as a batch (where execution of the first set of local environment verifications is divided into batches that are executed in sequence in accordance with a schedule). These parameters are used to control the number, the frequency and the schedule of the first set of environment verifications executed at individual computational machines of linear communication orbit 204, avoiding excessive consumption of computational and storage resource on these individual computational machines by the first set of local environment verifications.

After the local environment verification action is executed, results of the first set of local environment verifications are stored locally at the respective node of the first subset of nodes, and await to be collected by server 202. Then, server 202 injects a query message to collect the respective local results of the first set of local environment verifications from each of the first subset of nodes. In some embodiments, the query message is injected by server 202 in accordance with a second instruction received from the administrator machine 220 to generate a report regarding execution of the local environment verification action at the first subset of nodes. In some embodiments, the second instruction specifies a time interval for reissuing the query message to collect the respective local results of the first set of local environment verifications from the first subset of nodes. For example, the query message may be reissued once per minute, or other specified time interval, until all nodes in the first subset of nodes have reported a complete set of results for the first set of local environment verifications, or alternatively until either all nodes in the first subset of nodes have reported a complete set of results or a time limit or other termination condition is reached.

The query message for collecting local results is forwarded from node to node along linear communication orbit 204. The respective node of the first subset of nodes, in response to receiving the query message through the linear communication orbit 204, sends the respective local results of the first set of local environment verifications that have been obtained at said respective node to server 202 through linear communication orbit 204. For example, computational machine (M1) 210 receives the query message from server 202 via head node 206, and sends its local results of the first set of local environment verifications to server 202 along a report path A or a report path B. Report path A extends to server 202 via head node 206 and has a direction reverse to that of a query message path 222 along which the query message is passed along linear communication orbit 204. Report path B extends to server 202 via tail node 208 and has a direction consistent to that of the query message path 222. In some embodiments, when the local results of the first set of local environment verifications generated by computational machine (M1) 210 passes an intermediate machine (e.g., computational machine (M2) 212) on report path A or B, the local results generated by the intermediate machine are combined with the local results generated by computational machine M1 to produce a combined local results message (also called a response message) that is sent to server 202 along the same report path. Further, in some embodiments, after receiving the local results of the first subset of local environment verifications from the first subset of nodes in the computer network, server 202 generates a report on the local results of the execution of the first set of local environment verifications at the first subset of nodes, and provides the report to a user.

Further, in some embodiments, in accordance with the local results of the first set of local environment verifications, server 202 determines to execute a remedial action at the first subset of nodes in the network, and thereby sends a remedial action command to the first subset of nodes via linear communication orbit 204. Optionally, server 202 receives from administrator machine 220 a third instruction to issue the remedial action command to the respective node of the first subset of nodes. In some embodiments, the remedial action command includes one or more software patches to be installed on the respective node of the first subset of nodes to overcome security vulnerabilities detected via the first set of local environment verifications. In some embodiments, the remedial action command includes a warning message to be communicated to a user of the respective node of the first subset of nodes to remedial actions (e.g., changing a password).

In some embodiments, deployment status data are sent to server 202 from the first subset of nodes through the linear communication orbit 204. The deployment status data includes respective messages from one or more nodes in the first subset of nodes indicating status of establishment of the respective local environment verification framework at said one or more nodes. In accordance with the received deployment status data, server 202 may provide real-time deployment progress updates to a user while the local environment verification framework is being deployed on linear communication orbit 204. Additionally, server 202 may also provide a deployment status summary report indicating whether deployment of the local environment verification framework has been completed successfully or unsuccessfully at the end of the deployment. Similarly, in some embodiments, verification status data is also sent to server 202 from the first subset of nodes through linear communication orbit 204. The verification status data includes respective messages from one or more nodes in the first subset of nodes indicating completion status of the first set of local environment verifications at said one or more first subset of nodes. In accordance with the received verification status data, server 202 may provide real-time action progress updates to a user while the first set of local verifications are being executed on linear communication orbit 204. Additionally, server 202 may also provide a verification status summary report indicating whether the first set of local verifications is completed successfully or unsuccessfully at the end of the corresponding local environment verification action. It is noted that deployment or verification status data are also passed from any of the first subset of nodes (e.g., computational machine (M1) 210) to server 202 along report path A or B, along which the local results of the first set of local environment verifications are collected from the respective node of the first subset of nodes.

Figure 3A:
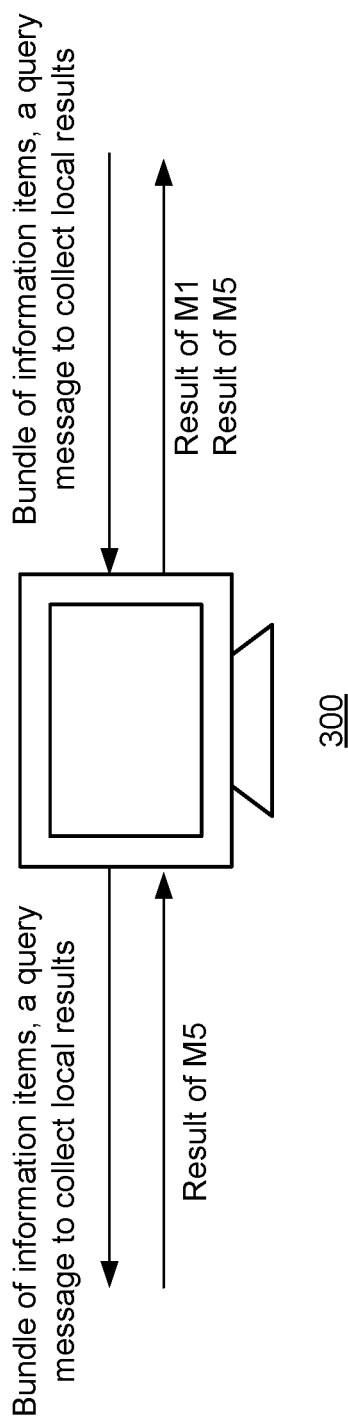
FIG. 3A illustrates an example computational machine that executes a local environment verification action in accordance with some embodiments.

FIG. 3A illustrates an example computational machine 300 (e.g., computational machine (M1) 210 in FIG. 2) that executes a local environment verification action in accordance with some embodiments. Machine 300 receives a bundle of information items regarding deployment of the local environment verification framework through linear communication orbit 204. Optionally, computational machine 300 obtains part or all of the bundle of information items from server 202 via one of its neighboring nodes when the local environment verification framework is deployed by server 202. Specifically, machine 300 determines that it needs to establish the local environment verification framework, and stores a copy of the part or all of the bundle of information items when the bundle of information items are distributed to machine 300 along linear communication orbit 204.

Alternatively, in some embodiments, machine 300 receives a command to collect and install the bundle of information items regarding deployment of a local environment verification framework with linear communication orbit 204. The bundle of information items has been divided into a plurality of file shards from which the bundle of information items are restorable. In some embodiments, the received command includes a manifest or listing of the information items to be installed and a listing or other identification of the shards into which the bundler of items has been divided. If machine 300 determines that it needs to obtain and/or install the bundle of information items, it generates a plurality of data requests to request the plurality of shards associated with the bundle of information items from other machines in linear communication orbit 204. If machine 300 already has some of the shards, it generates requests only for the shards it needs. In some embodiments, the plurality of shards are collected from two or more distinct machines on linear communication orbit 400. Over time, as machine 300 and other machines in the communication orbit 204 request the shards for the bundle of items, many of the shards will be locally cached at various machines in linear communication orbit 400. In some embodiments, one or more of the plurality of shards is collected from the server 202 because none of the computational machines in linear communication orbit 204 has a copy of those shards. Together the shards form, or can be combined to form the bundle of information items regarding deployment of the local environment verification framework at machine 300.

In some embodiments, machine 300 receives a query message from one of its two neighboring machines on linear communication orbit 204, and passes the query message to the other of its two neighboring machines. The query message is injected into linear communication orbit 204 to collect respective local results of the first set of local environment verifications from the first subset of nodes. When machine 300 determines that it is one of the first subset of nodes that needs to report its local results of the first set of local environment verifications, it provides its local results to either one of the neighboring machines, which subsequently passes the local results of machine 300 to server 202 in accordance with report path A or B as shown in FIG. 2. In some embodiments, machine 300 (e.g., machine (M1) 210) combines its own local results with local results of one or more other computational machines (e.g., machine (M5) 218) on linear communication orbit 204, and sends the combined local results to one of its neighboring machines (e.g., machine (M3) 214) in accordance with report path A or B.

Figure 3B:
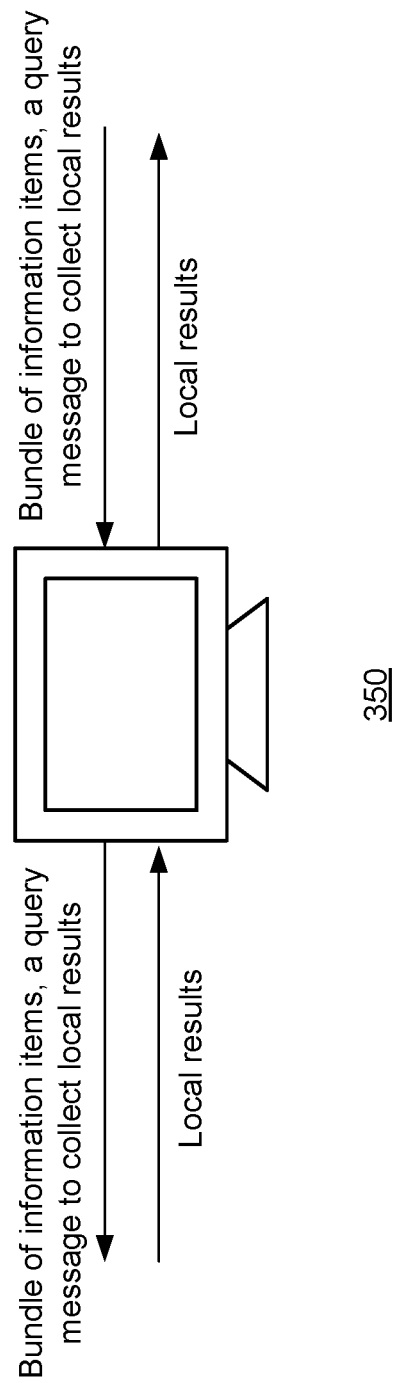
FIG. 3B illustrates an example intermediate computational machine that responds to a local environment verification action in accordance with some embodiments.

FIG. 3B illustrates an example intermediate computational machine 350 that responds to a local environment verification action in accordance with some embodiments. Computational machine 350 obtains one or more shards of the bundle of information items directly from server 202 or indirectly from server 202 via one of its neighboring nodes, after the local environment verification action is deployed by server 202. In some embodiments, when machine 350 determines that it does not need to install the local environment verification framework, it distributes the one or more shards of the bundle of information items to its other neighboring machine, and does not store a copy of the shards of the bundle of information items. Conversely, in some embodiments, machine 350 stores a copy of the one or more shards of the bundle of information items, when machine 350 determines that it does not need to install the local environment verification framework. The copy of the one or more shards of the bundle of information items (i.e., shards of the bundle of information items) is subsequently provided to computational machines of linear communication orbit 204 that send data requests to request such shards from linear communication orbit 204.

In some embodiments, machine 350 receives a query message from one of its two neighboring machines (which we can call a first neighboring machine for convenience) on linear communication orbit 204, and passes the query message to the other of its two neighboring machines (which we can call the other neighboring machine). The query message is injected into linear communication orbit 204 to collect respective local results of the first set of local environment verifications from the first subset of nodes. When machine 350 determines that it is not one of the first subset of nodes that need to report local results of the first set of local environment verifications, it returns local results received from the first neighboring machine (the one that sent the query to Machine 350) to the other one of the two neighboring machines, which subsequently passes the received local results to server 202 in accordance with report path A or B as shown in FIG. 2. The local results passed by machine 350 are local results that were generated by one or more computational machines in the first subset of nodes on linear communication orbit 204 that deploy the local environment verification framework.

As explained above, in some embodiments, server 202 divides the bundle of information items into a plurality of file shards from which the bundle of information items are restorable, and sends the plurality of file shards to linear communication orbit 204. Subsequently, when a computational machine is instructed to deploy the local environment verification framework, it collects one or more file shards associated with the bundle of information items from other computational machines in the linear communication orbit.

Figure 4:
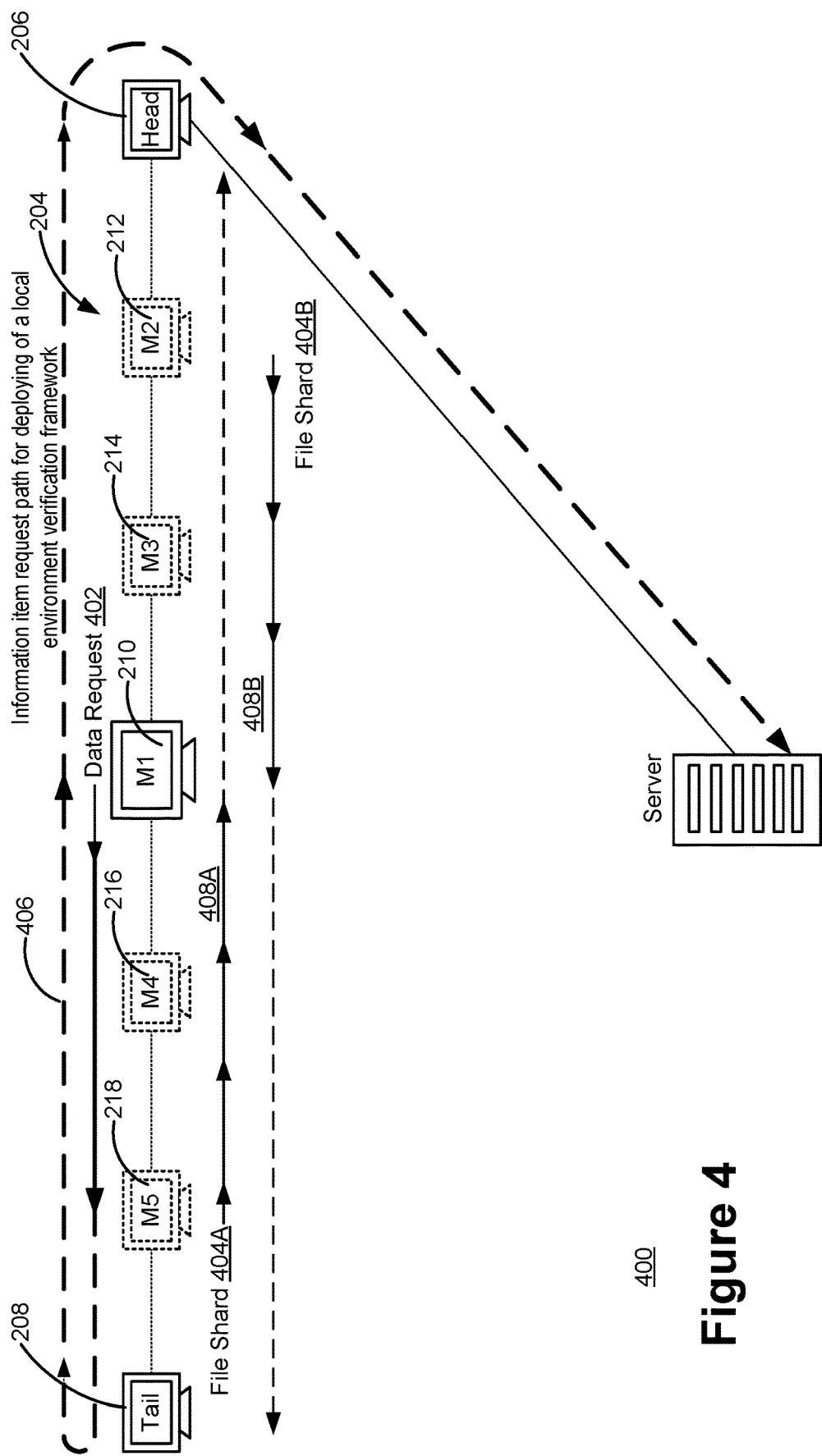
FIG. 4 illustrates an example linear communication orbit that transfers a data request and distributes a specific file shard for deploying a local environment verification framework to a computational machine in accordance with some embodiments.

FIG. 4 illustrates an example linear communication orbit 400 that transfers a data request 402 and distributes a specific file shard 404 for deploying a local environment verification framework to a computational machine (e.g., machine (M1) 210) in accordance with some embodiments.

To deploy the local environment verification framework to machine (M1) 210, server 202 sends to machine M1 a command to collect and install the bundle of information items regarding deployment of the local environment verification framework. In response to the command, machine (M1) 210 generates one or more data requests (e.g., data request 402) to request one or more file shards (e.g., file shard 404) from computational machines on linear communication orbit 204. Each of the data requests is a request for respective specific data (also called a shard). Together the shards form, or can be combined to form the bundle of information items regarding deployment of a local environment verification framework at machine M1.

Data request 402 originates from requester machine (M1) 210, and travels along at least a part of a data request path 406. In this example, data request path 406 originates from requester machine (M1) 210, extends along a forward communication channel of linear communication orbit 204, reaches tail node 208, reverses to follow a backward communication channel, reaches at head node 206, and if needed, extends to server 202. In some embodiments, in response to data request 402, requested file shard 404 is identified in a machine located on the data request path 406, and returned to requester machine (M1) 210 along a data return path 408 that varies according to the location of the machine having requested file shard 404. In some embodiments or in some circumstances (e.g., when the requester machine is an end node of linear communication orbit 204), data return path 408 extends from the location of the machine having the requested file shard to one of the two end nodes, tail node 206 and head node 208, of linear communication orbit 204.

In some embodiments, a cached copy of the requested file shard is identified in machine (M5) 218 located downstream of requester machine M1, and therefore, the data request 402 ceases to be passed to machines on the rest of data request path 406. In this circumstance, the requested file shard 404A is returned from machine M5 to machine M1 along a data return path 408A. As explained in more detail elsewhere, if head node 206 has also requested the same file shard 404A, data return path 408a may extend between data machine M1 and head node 204. Alternatively, in some embodiments, a cached copy of the requested file shard is identified in machine M2 located upstream of requester machine M1. The data request 402 ceases to be passed further upstream beyond machine M2, and the requested file shard 404A is returned from machine M2 to machine M1 along a data return path 408B. If tail node 208 has also requested the same file shard, return path 408B may extend between machine M1 and tail node 208.

In some embodiments or in some circumstances, data request 402 is transferred along data request path 406 until it reaches head node 206. In this example, no cached copy of the file shard 404 is identified in any computational machine within linear communication orbit 204. Therefore, head node 206 passes data request 402 to server 202 which provides the requested file shard to head node 308. Once it receives the specific data from server 314, head node 206 stores a copy of the requested file shard 404 and returns it along a data return path 408 that extends between head machine 206 and tail node 208, thereby delivering the copy of the requested file shard to machine M1.

FIG. 5 illustrates an example process 500 of providing file shards to a computational machine M1 on a linear communication orbit in accordance with some embodiments. Machine M1 receives a command to collect and install the bundle of information items regarding deployment of a local environment verification framework. The command is issued from a server and passed from another computational machine (e.g., a neighboring machine of machine M1) in the same linear communication orbit. According to the command, computational machine M1 needs to obtain a plurality of file shards, including a first file shard 502 and a second file shard 504, that together constitute an object to be installed or updated on computational machine M1 for deployment of a local environment verification framework. Therefore, computational machine M1 generates a plurality of data requests, including a first data request 506 and a second data request 508, for requesting some of the plurality of file shards from other machines on linear communication orbit 204. Each data request is sent by requester machine M1, and transferred along a respective information item request path 406. In response to each data request, the corresponding file shard is identified in a computational machine on linear communication orbit (e.g., file shards 502 and 504 are identified in machines M5 and M4, respectively), and returned to requester machine M1 along a respective data return path. More details on data requests, data caching and data distribution associated with an individual data request are explained above with reference to FIG. 4.

In some embodiments as shown in FIG. 5, although the two data requests originate from the same requester machine M1, their corresponding file shards are identified in different computational machines on linear communication orbit 204. Alternatively, in some embodiments or in some circumstances not shown in FIG. 5, the two data requests originate from the same requester machine M1, and their corresponding file shards are also identified in the same computational machine on linear communication orbit 204. After requester machine M1 collects the plurality of data shards in the object that needs to be installed or updated, requester machine M1 then combines the plurality of file shards to generate or reconstitute the object regarding deployment of the local environment verification framework according to the command received for collecting and installing the corresponding bundle of information items.

In many embodiments, multiple machines on linear communication orbit 204 (including machine M1) concurrently (i.e., during overlapping time periods) generate requests for the same shards of the same object regarding deployment of the local environment verification framework that needs to be installed or updated on these computational machines. As a result, machines in the linear communication orbit 204 could be flooded with a large number of data requests in a short period of time. Therefore, in some embodiments, at least some of these machines delay generating their respective data requests for file shards to avoid generating data requests for the same file shards within a short period of time. This allows data requests to be combined, and local caches of machines on linear communication orbit 204 to be gradually populated with the requested file shards in response to the same command associated with deployment of the local environment verification framework.

FIG. 6 illustrates an example process 600 of consolidating data requests issued by two distinct computational machines to request the same file shard for deploying a local environment verification framework on a linear communication orbit in accordance with some embodiments. In some embodiments, a server 202 sends a command that results in an identical object regarding deployment of a local environment verification framework being installed or updated on more than one computational machine on linear communication orbit 204. Different computational machines (e.g., machines M1 and M2) issue respective data requests to request the same specific data that constitute a shard of a bundle of information items regarding deployment of the local environment verification framework. In some embodiments, the respective data requests are generated in an asynchronous manner (e.g., offset by a duration of time less than a request threshold duration). Consolidation of such data requests helps avoid repetitive data request processing and redundant data caching.

In one example, requester machines M1 and M2 that request the same file shard receive a copy of the requested file shard from the same data machine M5, and share at least a part of their respective data request path. In some embodiments, data machine M5 is located downstream of both machines M1 and M2, while in other embodiments, data machine M5 is located upstream of both machines M1 and M2. However, in some embodiments, data machine M5 is located between machines M1 and M2, in which case machines M1 and M2 have non-overlapping data request paths and each directly obtains the copy of the specific data from data machine M5.

In some embodiments, a computational machine consolidates the data requests that separately originate from machines M1 and M2, when it determines that predefined criteria in a request consolidation method are satisfied for the data requests. In one example, the computational machine is one of requester machine M1, requester machine M2 or an intermediate machine that is located on an overlapping part of the corresponding data request paths of the data requests. Upon a determination that the criteria in the request consolidation method are met, the computational machine forgoes passing one of the data requests along at least a part of its respective data request path. In accordance with some example criteria in the request consolidation method, the computational machine determines whether another data request has been previously generated or processed to request the same specific data during a predetermined period of time. The period of time expires when the corresponding specific data are returned, or an expiration time (e.g., a predetermined amount of time after the request is generated or transferred to a next machine along the data request path) is reached.

As shown in FIG. 6, two computational machines M1 and M2 respectively generate a first data request 602 and a third data request 604 to request the same file shard of the bundle of information items regarding deployment of a respective local environment verification framework. In some circumstances, the third data request 604 is generated at machine M2 after the first data request 602 has been generated and passed to a next machine on the data request path by machine M1. Thus, when the third data request 604 reaches machine M1, machine M1 detects a retained tracking record for the first data request 602, and based on that information, forgoes sending the third data request 604 to a next machine on the data request path. Machine M1 waits for the corresponding file shard to be returned in response to the first data request 602, and uses the same file shard to satisfy the third data request 604. Alternatively, in certain circumstances, the first data request 602 is generated at machine M1 after the third data request 604 has been generated by machine M2 and passed to a next machine on the data request path by machine M1. Based on a tracking record for the third data request, the first data request is not passed by machine M1 to a next machine along the data request path.

More generally, each machine that issues or passes a data request retains a tracking record of the request until a response with the request file shard is received, at which point the tracking record is either removed or marked as no longer pending. If a subsequent request is received after the earlier request has received a response, then the processing of the later data request is not impacted by the earlier request, except that the specific data required to respond to the later request is likely to be locally cached by at least one machine in the linear communication orbit 204.

When a machine collects from linear communication orbit 204 all the file shards that constitute the bundle of information items regarding deployment of the local environment verification framework, the local environment verification framework is established at a respective node of a computer network corresponding to the machine in accordance with the bundle of information items. The machine then performs a first set of local environment verifications using the local environment verification framework. Results from the first set of local environment verifications are stored locally in a memory of the machine, and await collection from the memory of the machine in response to a query message that is sent by a server to collect local results from a first subset of machines on linear communication orbit 204, including the machine on which the local environment verification framework has been established.

In many embodiments, multiple machines on linear communication orbit 204 (including machine M1) concurrently (i.e., during overlapping time periods) execute local environment verification actions and generate results from a predetermined set of local environment verifications. If these local environment verification results are returned individually by each computational machine when they are ready, machines in the linear communication orbit 204 and server 202 could be flooded with a large number of verification results communications in a short period of time. Therefore, in some embodiments, at least some of these machines hold their local environment verification results in their memory, and delay reporting the results to server 202 until server 202 proactively requests the results. This allows the local environment verification results to be reported in a managed manner without causing excessive traffic to access the linear communication orbit and the server.

Figure 7:
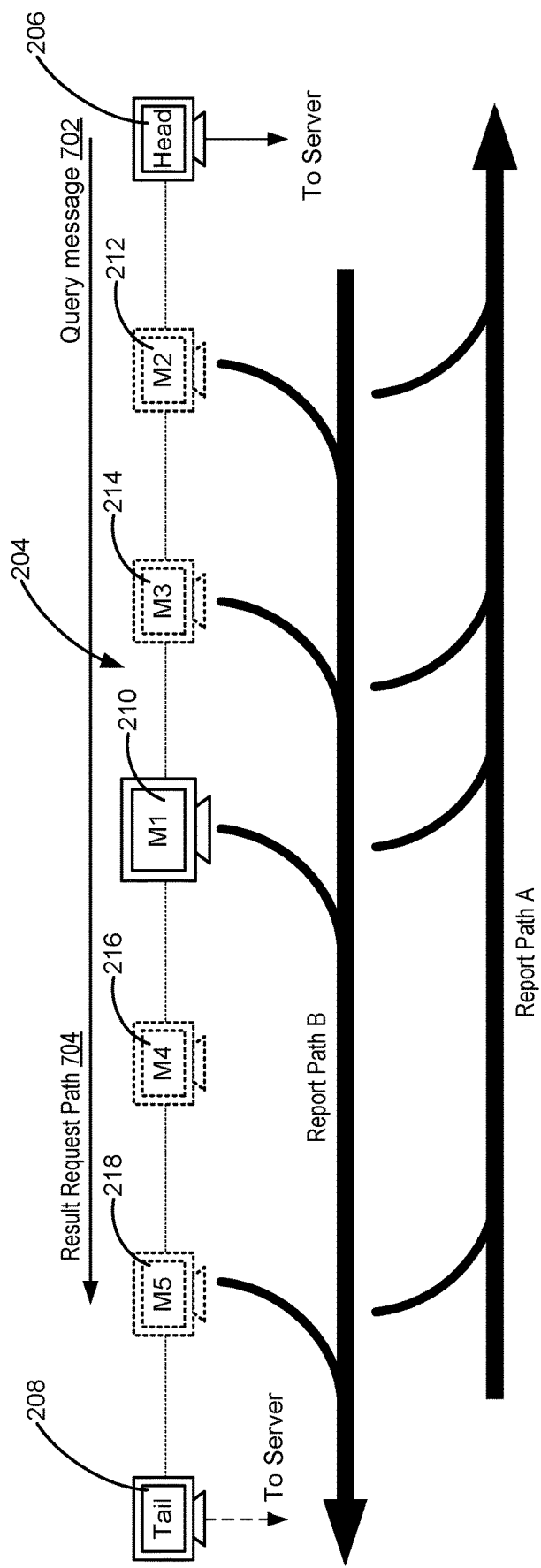
FIG. 7 illustrates an example process of returning local environment verification results in response to a query message on a linear communication orbit in accordance with some embodiments.

FIG. 7 illustrates an example process 700 of returning local environment verification results in response to a query message 702 on a linear communication orbit 204 in accordance with some embodiments. Server 202 injects the query message 702 into linear communication orbit 204 to collect respective local results of the first set of local environment verifications from the first subset of nodes. In accordance with an example result request path 704, the query message is initially received at head node 206 of linear communication orbit 204, and then passed from node to node along linear communication orbit 204 until it reaches tail node 208 of linear communication orbit 204. Each node of the first subset of nodes that has deployed the local environment verification network responds to the query message by sending the respective local results of the first set of local environment verifications that have been obtained at said respective node to server 202 through linear communication orbit 204, as described in more detail below. Alternatively, if an intermediate machine (e.g., machine (M4) 216) determines that it is not one of the first subset of nodes, it passes the query message 702 from a first neighboring machine to a second neighboring machine on linear communication orbit 204.

In some embodiments, linear communication orbit 204 includes a report path A that is opposite to result request path 704. In response to receiving the query message 702 to collect its local results, each node of linear communication orbit 204 determines whether it is one of the first subset of nodes that has deployed the local environment verification network and whether the local results are available. If a specific machine (e.g., machine (M3) 214) determines that the respective node is one of the first subset of nodes and that the local results are available, it returns its local environment verification results to a neighboring machine (e.g., machine M2) from which the specific machine at the respective node received the query message. Optionally, the specific machine delays returning its local environment verification results until aggregated local environment verification results come downstream on report path A and reaches the specific machine. The local environment verification results at the respective node are incorporated into the aggregated local environment verification results, and passed downstream to the neighboring machine on report path A in an aggregated manner. When the aggregated local environment verification results reach head nod 206, the computational machine at head node 206 reports the aggregated results to server 202.

Alternatively, in some embodiments, linear communication orbit 204 includes a report path B that is consistent with the result request path 704. In response to receiving from a first neighboring machine (e.g., machine M2) the query message 702 to collect its local results, a specific machine (e.g., machine M3) determines that the respective node is one of the first subset of nodes and that the local results are available. The specific machine passes its local environment verification results to a second neighboring machine (e.g., machine M1) to which the specific machine at the respective node passes the query message 702. Optionally, the specific machine delays passing its local environment verification results until aggregated local environment verification results come downstream along report path B and reach the specific machine. The local environment verification results at the respective node are incorporated into the received aggregated local environment verification results (e.g., in an aggregated results message or file, or in query message 702) and passed downstream to the neighboring machine on report path B in an aggregated manner. When the aggregated local environment verification results reach tail node 208, the computational machine at tail node 208 reports the aggregated results to server 202.

In some embodiments or in some circumstances, when the aggregated local environment verification results reach one of the first subset of nodes, the local results at the one of the first subset of nodes are not available yet. The computational machine at the one of the first subset of nodes passes the aggregated local environment verification results to a next mode in a corresponding report path. Optionally, the computational machine at the one of the first subset of nodes generates a verification status message indicating the progress of the first set of local environment verifications, and the verification status message is sent down the corresponding path in conjunction with the aggregated local environment verification results. Optionally, the computational machine at the one of the first subset of nodes holds the aggregated local environment verification results for a predetermined wait time (e.g., up to, but no longer than, the predetermined wait time), such that the computational machine at the one of the first subset of nodes could complete the first set of local environment verifications and report its local results together with the aggregated local environment verification results.

In some embodiments, the query message 702 is directed to collecting results for the first set of local environment verifications from the first subset of nodes according to predefined age criteria. Upon receiving the query message 702, each node of the first subset of nodes determines that cached results for the first set of local environment verifications meet the predefined age criteria, and sends the cached results to server 202 through linear communication orbit 204. In contrast, when a respective node of the first subset of nodes determines that the cached results for the first set of local environment verifications do not meet the predefined age criteria, it optionally aborts reporting the cached results of the first set of local environment verifications to server 202, or reports the cached results (e.g., the most recent results) to server 202 through linear communication orbit 204 regardless of whether the cached results meet the predefined age criteria. In some embodiments, query message 702 is sent repeatedly from server 202 to the nodes in a linear communication orbit according to a specified or predetermined schedule. In some embodiments, the repeated sending of query message 702 by server 202 stops once all nodes in a target set of nodes (e.g., the first subset of nodes) have reported their local verification results.

In an example, the predefined age criteria defines that the local verification results to be reported are generated within 20 minutes prior to receiving the query message. In another example, the predefined age criteria defines that the local verification results to be reported are generated within 24 hours prior to receiving the query message. One or more sets of local environment verification results are returned to server 202 as far as they are generated within 24 hours prior to receiving the query message.

In some other embodiments, the query message is directed to collecting local verification results for the first set of local environment verifications from the first subset of nodes according to a predetermined reporting schedule. The query message defines the reporting schedule as one or more of: a duration of regular reporting (e.g., Jan. 1-20, 2018), a result reporting frequency (e.g., once per hour, or once every 24 hours) and one or more reporting times (e.g., 12 PM, 2 AM). Upon receiving the query message once, each node of the first subset of nodes regularly sends its recent local results to server 202 through linear communication orbit 204 according to the predetermined reporting schedule. In some embodiments, the reporting schedule defines a termination date/time for such a regular reporting scheme. In some embodiments, another reporting control message is sent to the first subset of nodes via linear communication orbit 204 to abort the regular reporting scheme.

It is noted that in some embodiments, server 202 injects a query message 702 into linear communication orbit 204 to inquire deployment status or verification status from the first subset of nodes. The query message for deployment status or verification status is also distributed to the first subset of nodes on linear communication orbit 204 along result request path 704 (i.e., the query message is initially received at head node 206 of linear communication orbit 204, and then passed from node to node along linear communication orbit 204 until it reaches tail node 208 of linear communication orbit 204). Each node of the first subset of nodes responds to the query message by sending corresponding status information that has been obtained at said respective node to server 202 through linear communication orbit 204. Optionally, one or more nodes of the first subset of nodes receive aggregated status information that comes downstream along report path A or B, and incorporates its own status information into the aggregated status information before passing it further downstream on report path A or B. Alternatively, if an intermediate machine (e.g., machine M4) determines that the respective node is not one of the first subset of nodes, it passes the corresponding status information (aggregated or individual) it receives from a first neighboring machine to a second neighboring machine on linear communication orbit 204.

In some embodiments, server 202 receives deployment status data from the first subset of nodes through linear communication orbit 204. The deployment status data includes respective messages from one or more nodes in the first subset of nodes indicating status of establishment of the respective local environment verification framework at said one or more nodes. In accordance with the received deployment status data, server 202 provides deployment progress updates to a user. Under some circumstances, the deployment status data are reported from the first subset of nodes at a substantially high refresh rate (e.g., controlled by a predefined age criteria of the local verification results), such that the deployment progress updates are provided substantially in real time to the user. Similarly, in some embodiments, server 202 receives verification status data from the first subset of nodes through linear communication orbit 204. The verification status data includes respective messages from one or more nodes in the first subset of nodes indicating status of the first set of local environment verifications at said one or more nodes. In accordance with the received verification status data, server 202 provides action progress updates to a user. Under some circumstances, the verification status data are reported from the first subset of nodes at a substantially high rate (e.g., every one minute), such that the action progress updates are provided in real time to the user.

Figure 8A:
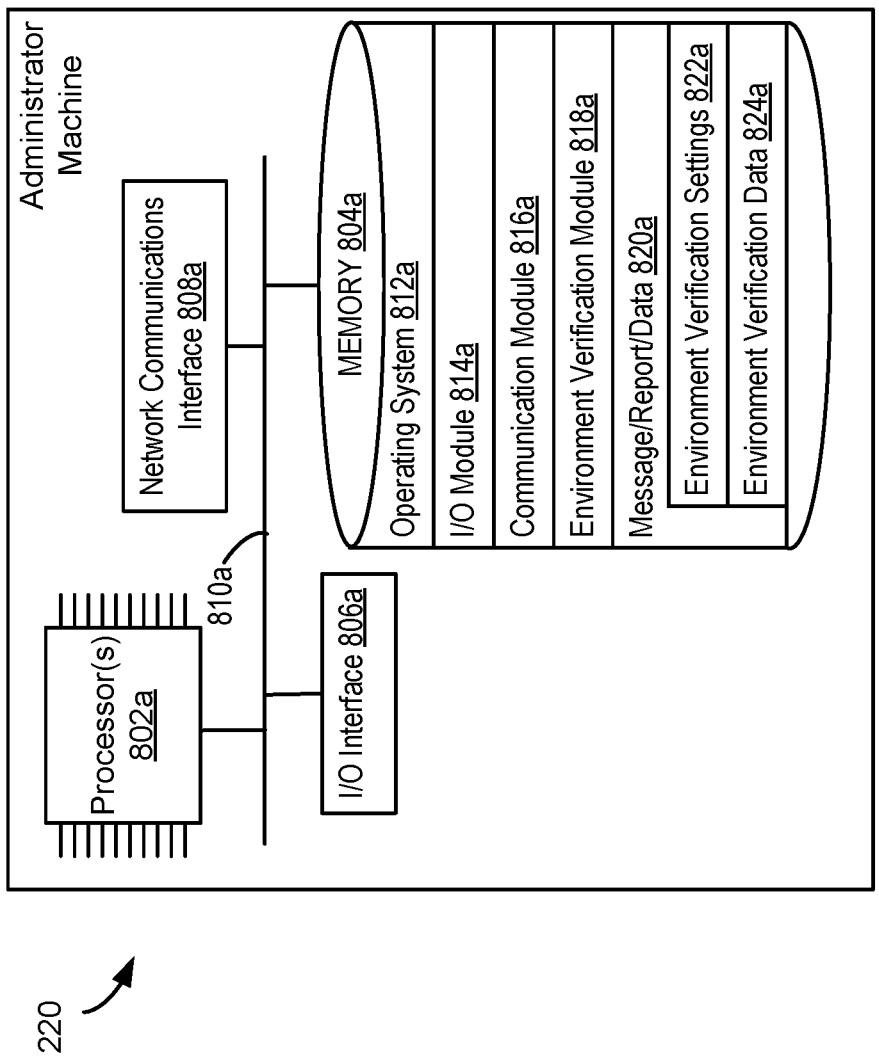
FIG. 8A is a block diagram of an example administrator machine in one of the example linear communication orbits shown in FIGS. 1-7 in accordance with some embodiments.

FIG. 8A is a block diagram of an example administrator machine 220 in one of the example linear communication orbits shown in FIGS. 1-7 in accordance with some embodiments. In some embodiments, machine 220 includes one or more processors 802a, memory 804a for storing programs and instructions for execution by one or more processors 802a, one or more communications interfaces (such as input/output interface 806a and network interface 808a), and one or more communications buses 810a for interconnecting these components.

In some embodiments, input/output interface 806a includes a display and input devices such as a keyboard, a mouse or a track-pad. In some embodiments, communication buses 810a include circuitry (sometimes called a chipset) that interconnects and controls communications between system components. In some embodiments, memory 804a includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804a includes one or more storage devices remotely located from the one or more processors 802a. In some embodiments, memory 804a, or alternatively the non-volatile memory device(s) within memory 804a, includes a non-transitory computer readable storage medium.

In some embodiments, memory 804a or alternatively the non-transitory computer readable storage medium of memory 804a stores the following programs, modules and data structures, instructions, or a subset thereof:

- Operating System 812a that includes procedures for handling various basic system services and for performing hardware dependent tasks;
- I/O module 814a that includes procedures for handling various basic input and output functions through one or more input and output devices;

Communication module 816*a* that is used for connecting machine 220 to servers (e.g., server 202) and/or computational machines 206-218 via one or more network communication interfaces 808*a* (wired or wireless) and one or more communication networks, such as the Internet, other wide area networks, local area networks, metropolitan area networks, and so on;

Environment verification module 818*a* that includes instructions for handling receipt, processing, propagation, collecting and reporting of system, security and network management messages/commands configured to verify local environments of nodes in a network of interconnected machines (e.g., instructions for providing a user interface to receive user inputs of one or more parameters for performing a set of local environment verifications at a first subset of nodes of a linear communication orbit, instructions for presenting, via the user interface, local environment verification results collected from a linear communication orbit); and Messages, reports and/or other data 820*a* that is stored, temporarily or otherwise, upon receipt from server 202, and/or that is locally generated, revised or supplemented by machine 220 prior to transmission to server 202. In some embodiments, messages, reports and/or other data 820*a* further include one or more of: environment verification settings 822*a* of the local environment verification framework (e.g., compliance benchmarks, benchmark engines, computer groups and operation parameters), and environment verification data 824*a* collected from the first subset of nodes of one or more linear communication orbits 204 regarding deployment or execution of the local environment verification framework (e.g., local verification results, deployment status data and verification status data) by nodes on those linear communication orbits 204.

Optionally, administrator machine 220 is a machine coupled to server 202, but does not belong to a linear communication orbit 204 on which the local environment verification framework is deployed. Optionally, administrator machine 220 is integrated within server 202. More details on server 202 are provided below with respect to FIG. 8B.

Optionally, administrator machine 220 is a computational machine coupled on a linear communication orbit 204 and configured to function as an administrator to control deployment of the local environment verification framework and collect local environment verification results from the linear communication orbit 204. In these circumstances, administrator machine 220 includes one or more of: an orbit formation module for implementing a predetermined set of rules for creating, maintaining, and repairing the linear communication orbit for deploying the local environment verification framework; neighboring node information identifying neighboring nodes of machine 220; a data distribution module for handling receipt, processing, propagation, collecting and reporting in response to system management messages for distributing objects to be installed or updated on machine 220 (e.g., a command to deploy the local environment verification framework); a data request module for processing data requests received from a predecessor node, successor node or server, and a data caching module for receiving, caching, and propagating specific data that pass machine 220. More details on embodiments of administrator machine 220 coupled on (or included in) a linear communication orbit 204 are provided below with reference to FIG. 8C.

Figure 8B:
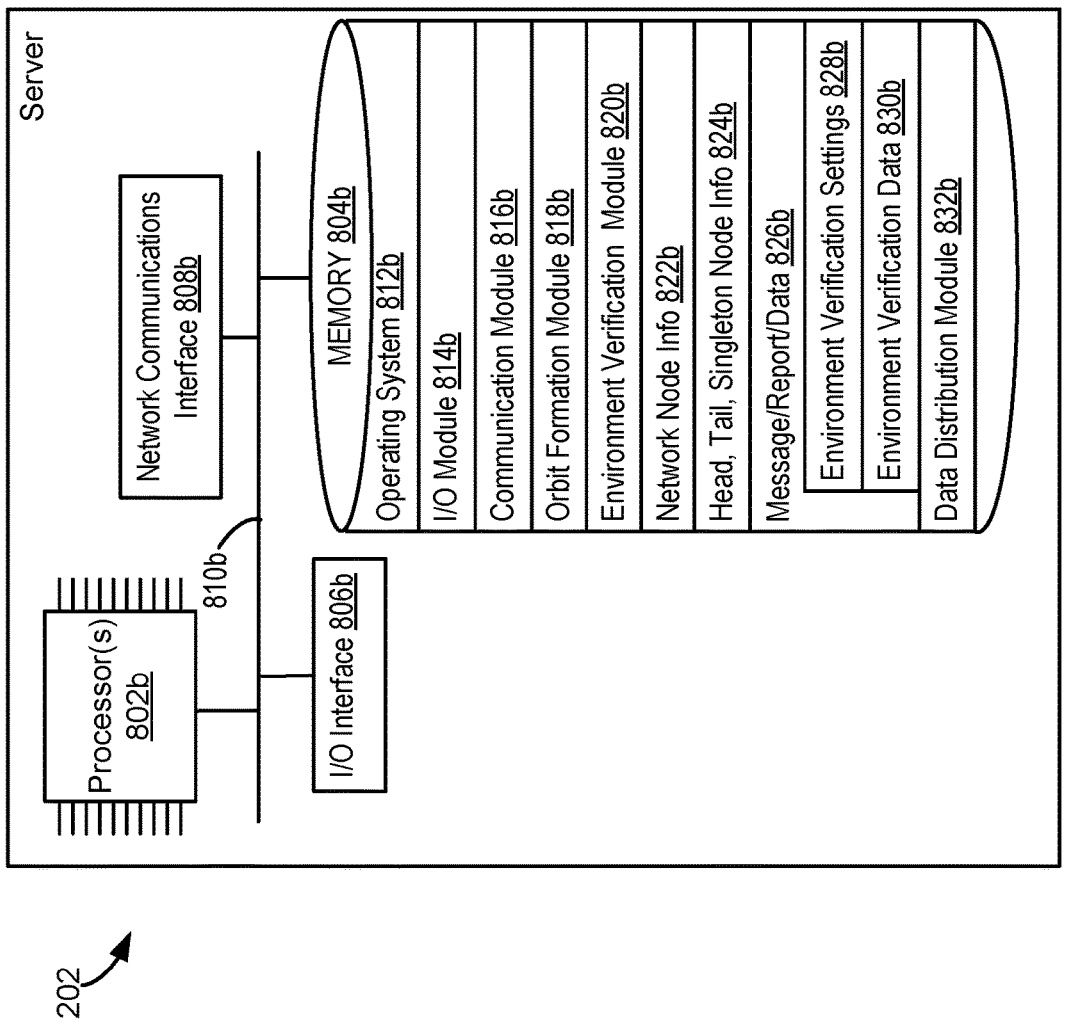
FIG. 8B is a block diagram of an example server in one of the example linear communication orbits shown in FIGS. 1-7 in accordance with some embodiments.

FIG. 8B is a block diagram of an example server 202 in one of the example linear communication orbits shown in FIGS. 1-7 in accordance with some embodiments. In some embodiments, server 108 includes one or more processors 802*b*, memory 804*b* for storing programs and instructions for execution by the one or more processors 802*b*, one or more communications interfaces such as input/output interface 806*b* and network interface 808*b*, and one or more communications buses 810*b* for interconnecting these components.

In some embodiments, server 202 does not include an input/output interface 806*b*. In some embodiments in which server 202 does include an input/output interface 806*b*, input/output interface 806*b* includes a display and input devices such as a keyboard, a mouse or a track-pad. In some embodiments, communication buses 810*b* include circuitry (sometimes called a chipset) that interconnects and controls communications between system components. In some embodiments, memory 804*b* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804*b* includes one or more storage devices remotely located from the one or more processors 802*b*. In some embodiments, memory 804*b*, or alternatively the non-volatile memory device(s) within memory 804*b*, includes a non-transitory computer readable storage medium.

In some embodiments, memory 804*b* or alternatively the non-transitory computer readable storage medium of memory 804*b* stores the following programs, modules and data structures, instructions, or a subset thereof:

Operating System 812*b* that includes procedures for handling various basic system services and for performing hardware dependent tasks.

I/O module 814*b* that includes procedures for handling various basic input and output functions through one or more input and output devices.

Communication module 816*b* that is used for connecting server 202 to one or more computational machines (e.g., administrator machine 220, and machines 206-218 on linear communication orbit 204) coupled to network 100 via one or more network communication interfaces 808*b* (wired or wireless) and one or more communication networks, such as the Internet, other wide area networks, local area networks, metropolitan area networks, and so on.

Orbit formation module 818*b* that includes instructions to implement a predetermined set of rules for creating, maintaining, and repairing one or more linear communication orbits for network and system management (e.g., to determine which machines 102, of all machines 102 currently known to be coupled to network 100, are coupled to the same local area network, and to communicate information to those machines to enable them to self-organize into a linear communication orbit), where in some embodiments, orbit formation module 818*b* also stores a list of singletons, and head nodes and/or tail nodes of the linear communication orbits in the network;

Environment verification module 820*b* that includes instructions for handling receipt, processing, propagation, collecting and reporting of system, security and network management messages/commands configured to verify local environments of nodes in a network of connected machines (e.g., query messages related to deployment, execution, status checking and result collection of local environment verifications for nodes in one or more local communicator orbits 204);

Network node information 822*b* that includes information identifying all nodes known to be coupled to network 100, where in some embodiments, server 202 maintains a record of nodes currently known to be coupled to the managed network and their respective unique identifiers (e.g., IP addresses and optionally other unique identifiers), and optionally, server 202 also maintains the ordinal positions of these machines in a sorted sequence according to their respective unique identifiers;

Head, tail and singleton node information 824*b* for identifying head nodes, tail nodes and singleton nodes with established communication channels to and/or from server 202, where in some embodiments, server 202 maintains a list of head nodes, tail nodes, and singleton nodes that have opened forward and backward connections with server 202;

Messages, reports and/or other data 826*b* that is stored, temporarily or otherwise, upon receipt from computational machine 102 or administrative machine 220, and/or that is locally generated, revised or supplemented by server 202 prior to transmission to computational machine 102 or administrative machine 220, where in some embodiments, messages, reports and/or other data 828*b* further include one or more of: environment verification settings 822*a* of the local environment verification framework (e.g., compliance benchmarks, benchmark engines, computer groups and operation parameters), and environment verification data 830*b* collected from the first subset of nodes of linear communication orbit 204 regarding deployment or execution of the local environment verification framework (e.g., local verification results, deployment status data and verification status data) on linear communication orbit 204; and Data distribution module 832*b* that includes instructions for providing a particular system management message and collecting status messages for distribution and caching of an object (e.g., query messages related to deployment, execution, status checking and result collection of local environment verifications). In some embodiments, the data distribution module 832*b* is included in the environment verification module 820*b*. Specifically, the data distribution module 832*b* generates a system management message that includes one or more data distribution commands and/or manifests for distributing to at least one computational machine on a linear communication orbit a bundle of information items regarding deployment of a local environment verification framework. Optionally, the linear communication orbit returns at least one caching status message to server 202, and the data distribution module 832*b* tracks locations on the linear communication orbit of locally cached copies of each shard included in the bundle of information items.

In some embodiments, environment verification module 820*b* of server 202 provides a user interface for an administrator to dispatch the bundle of information items regarding deployment of the local environment verification framework to a selected group of machines, i.e., to receive user inputs of one or more parameters for performing a set of local environment verifications at a first subset of nodes of the linear communication orbit. Environment verification module 820*b* of server 202 may also enable presenting on the user interface local environment verification results, deployment status information and verification status information collected from linear communication orbit 204.

Figure 8C:
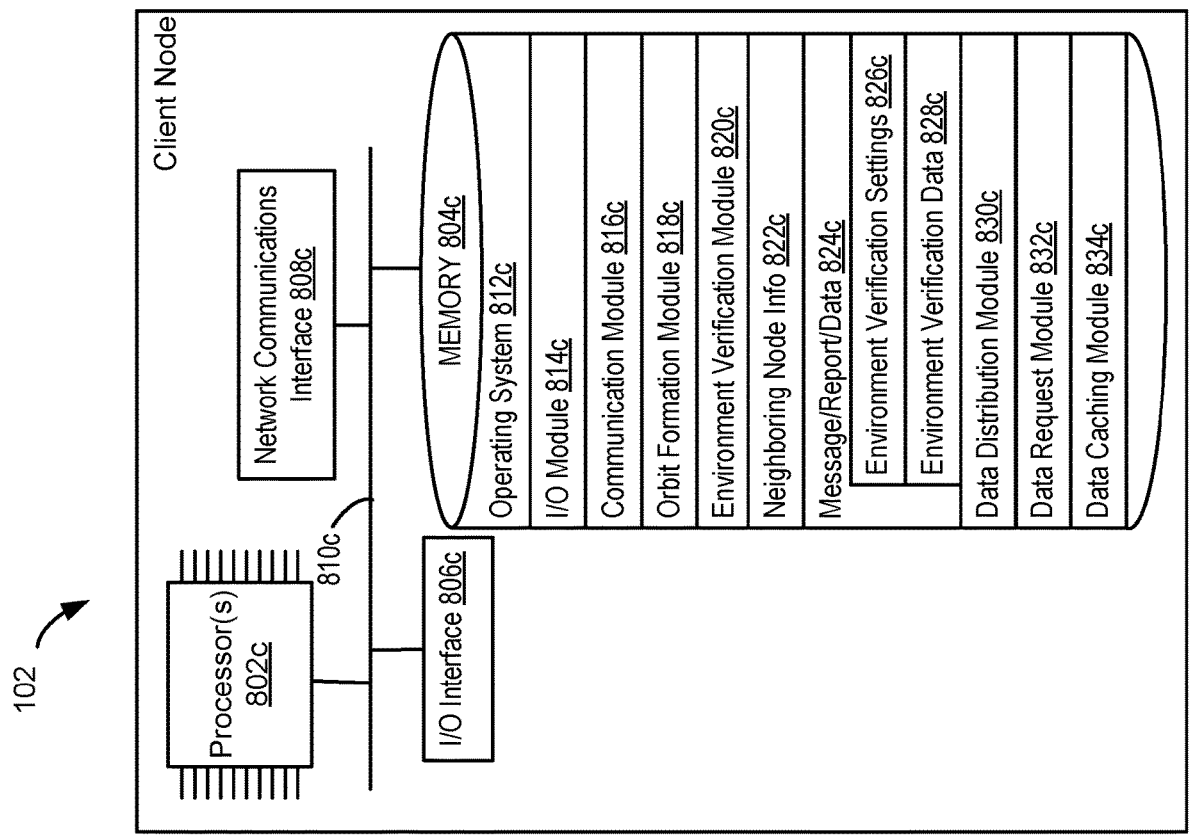
FIG. 8C is a block diagram of an example computational machine in the example linear communication orbits shown in FIGS. 1-7 in accordance with some embodiments.

FIG. 8C is a block diagram of an example computational machine 102 (e.g., computational machines 206-218) in the example linear communication orbits shown in FIGS. 1-7 in accordance with some embodiments. In some embodiments, machine 102 includes one or more processors 802*c*, memory 804*c* for storing programs and instructions for execution by one or more processors 802*c*, one or more communications interfaces such as input/output interface 806*c* and network interface 808*c*, and one or more communications buses 810*c* for interconnecting these components.

In some embodiments, input/output interface 806*c* includes a display and input devices such as a keyboard, a mouse or a track-pad. In some embodiments, communication buses 810*c* include circuitry (sometimes called a chipset) that interconnects and controls communications between system components. In some embodiments, memory 804*c* includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804*c* includes one or more storage devices remotely located from the one or more processors 802*c*. In some embodiments, memory 804*c*, or alternatively the non-volatile memory device(s) within memory 804*c*, includes a non-transitory computer readable storage medium.

In some embodiments, memory 804*c* or alternatively the non-transitory computer readable storage medium of memory 804*c* stores the following programs, modules and data structures, instructions, or a subset thereof:

Operating System 812*c* that includes procedures for handling various basic system services and for performing hardware dependent tasks;

I/O module 814*c* that includes procedures for handling various basic input and output functions through one or more input and output devices;

Communication module 816*c* that is used for connecting machine 102 to other machines (e.g., other machines 102 in network 100) or servers (e.g., server 202) via one or more network communication interfaces 808*c* (wired or wireless) and one or more communication networks, such as the Internet, other wide area networks, local area networks, metropolitan area networks, and so on;

Orbit formation module 818*c* that includes instructions implementing a predetermined set of rules for creating, maintaining, and repairing the linear communication orbit for network and system management;

Environment verification module 820*c* that includes instructions for handling receipt, processing, propagation, collecting and reporting of system, security and network management messages/commands configured to verify the local environment of machine 102 (e.g., query messages related to deployment, execution, status checking and result collection of local environment verifications);

Neighboring node information 822*c* that includes information identifying neighboring nodes of a machine on the linear communication orbit 204;

Messages, reports and/or other data 824*c* that is stored, temporarily or otherwise, upon receipt from another computational machine 102 or server 202, and/or that is locally generated, revised or supplemented by machine 102 prior to transmission to another computational machine 102 or server 202, where in some embodiments, messages, reports and/or other data 820a further include one or more of: environment verification settings 826c of the local environment verification framework (e.g., compliance benchmarks, benchmark engines, computer groups and operation parameters), and environment verification data 828c collected from the first subset of nodes of the linear communication orbit 204 regarding deployment or execution of the local environment verification framework (e.g., local verification results, deployment status data and verification status data);

Data distribution module 830c that includes instructions for handling receipt, processing, propagation, collecting and reporting in response to system management messages for distributing objects to be installed or updated on machine 102 (e.g., query messages related to deployment, execution, status checking and result collection of local environment verifications), where in some embodiments, the data distribution module 830c is included in the environment verification module 820c, and in some embodiments, the data distribution module 830c generates a plurality of data requests for collecting the bundle of information items regarding deployment of the local environment verification framework, identifies or receives a respective specific file shard in response to each data request, and generates or reconstitutes the bundle of information items from the identified or received specific data;

Data request module 832c that includes instructions for processing data requests received from a predecessor node, successor node or server;

Data caching module 834c that includes instructions for receiving, caching, and propagating specific data received by this specific machine 102 (e.g., data received by this specific machine due to a data request by another machine in the same linear communication orbit 204 as this specific machine 102, as described above with reference to FIGS. 4-6) and optionally for reporting related caching activities at machine 102.

FIGS. 8A-8C are merely illustrative of the structures of machine 220, server 202 and machine 102. A person skilled in the art would recognize that particular embodiments of machine 220, server 850 and machine 102 may include more or fewer components than those shown. One or more modules may be divided into sub-modules, and/or one or more functions may be provided by different modules than those shown. In some embodiments, server 202 implements or performs one or more methods, including the methods described below with respect to FIGS. 11A-11G.

FIG. 9 is an example user interface (UI) 900 displayed on an administrator machine 220 for setting up deployment of a local environment verification framework on a linear communication orbit 204 in accordance with some embodiments. UI 900 allows an administrator user to identify a bundle of information items regarding deployment of the local environment verification, including information of a platform 902, an architecture 904, a compliance engine 906 and a computer group 908. In some embodiments, each of platform 902, architecture 904, compliance engine 906 and computer group 908 is associated with a predetermined list of options. For example, platform 902 can be chosen from a list of operating systems including Windows, Linux and OS X. Compliance engine 906 can be selected from a list of compliance and vulnerability engines and corresponding runtime environments that support the compliance and vulnerability engines. In an example, a Java Runtime Environment (JRE) is loaded in response to a selection in compliance engine 906, and CIS Configuration Assessment Tool (CIS-CAT) engine is selected to be implemented in the JRE. Each of the compliance and vulnerability engines is configured to implement standard or custom configuration benchmarks. In some embodiments, the administrator user is allowed to select more than one engine in the list of compliance and vulnerability engines associated with compliance engine 906. In some embodiments, when a platform and an architecture are selected, compliance engine 906 is automatically associated with a specific sub-list of compliance and vulnerability engines corresponding to the selected platform and architecture.

Computer group 908 identifies a set of nodes/endpoints that run an operating system specified by the platform 902 for the local environment verification framework to work properly. Specifically, computer group 908 identifies computational machines 102 at a first subset of nodes in linear communication orbit 204. In some embodiments, computer group 908 defines one or more characteristics for dynamically identifying the first subset of nodes, and the respective node of the subset of nodes self-identifies as belonging to the first subset of nodes based on the one or more characteristics. The one or more characteristics can identify computational machines 102 by their respective operating systems. In one example, a local environment verification action is requested for all Windows machines on linear communication orbit 204.

In some embodiments, a local environment verification framework is deployed for once when the administrator user selects "Run Once" (not shown) as a scheduling option. In some embodiments, the local environment verification framework is deployed for multiple times when the administrator user selects "recurring" (not shown) as a scheduling option. Scheduling fields 910, 912, 914 and 916 enable the administrator user to set up a start time, an end time, a duration and a frequency for the deployment of the local environment verification framework. Specifically, "Start at:" and "End at:" fields 910 and 912 limit the deployment of the local environment verification framework to a specific time period defined by the corresponding start and end times. "Distribute Over:" 914 allows selection or entering of an interval in minutes, hours or days within which the deployment of the local environment verification framework is completed. "Reissue Every:" 916 allows selection or entering of an interval in minutes, hours or days in which the deployment of the local environment verification frameworks is repeated; alternatively, in some embodiments a frequency value (e.g., the number of times the deployment of the local environment verification framework are to be repeated, per hour or per day) is provided by the user or administrator.

In response to a user click on an affordance 918 (e.g., "Create & Deploy" 918), administrator machine 220 issues a first instruction to deploy a local environment verification framework to the first subset of nodes on linear communication orbit 204. The first instruction includes the information identified in one or more of fields 902-916. In response to receiving the first instruction, server 202 assembles the bundle of information items and injects the bundle of information items into the linear communication orbit 204.

Figure 10A:
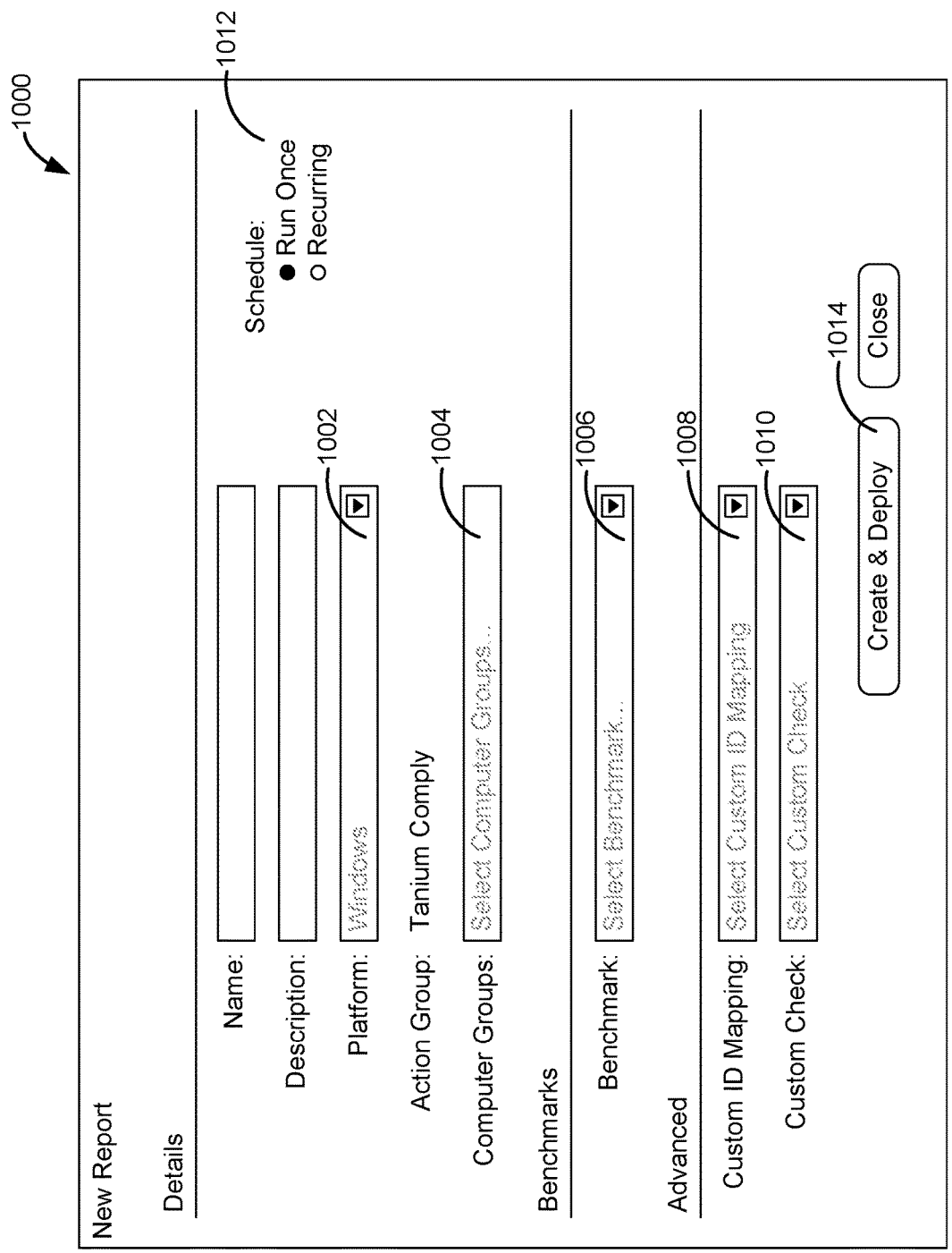
FIG. 10A is an example user interface displayed on an administrator machine for generating a request for executing local environment verifications or collecting local environment verification results from a linear communication orbit in accordance with some embodiments.

FIG. 10A is an example user interface (UI) 1000 displayed on an administrator machine 220 for generating a request for executing local environment verifications or collecting local environment verification results from a linear communication orbit 204 in accordance with some embodiments. UI 1000 allows an administrator user to define a platform 1002, and a computer group 1004 from which local results of the first set of local environment verification are collected. In some embodiments, each of platform 1002 and computer group 1004 is associated with a predetermined list of options. Computer group(s) 1004 identifies computational machines 102 at the first subset of nodes in linear communication orbit 204.

As explained above, the bundle of information items regarding deployment of the respective local environment verification framework includes a plurality of compliance benchmarks. In some embodiments, more than one benchmark is included in the first set of local environment verifications performed at the first subset of nodes on linear communication orbit 204. UI 1000 further includes a benchmark field 1006 allowing the administrator user to determine a subset of the first set of local environment verifications for review on administrator machine 220.

In some implementations, the plurality of compliance benchmarks (e.g., those that are selectable in the benchmark field 1006) include a plurality of rules, and first identifiers of the plurality of rules are mapped to second identifiers of the plurality of rules that are determined in "Custom ID Mapping" 1008. As such, when a report of local environment verifications is established as a result of a local environment verification action, server 202 generates a first report that includes the first identifiers of the plurality of rules associated with the benchmarks of the local environment verification framework, and/or a second report that includes the second identifiers of the plurality of rules. Administrator machine 220 optionally presents one or both of the first and second reports to the administrator user. In some embodiments, the second identifiers are customized for use by the linearly ordered communication orbit, and are identifiers that are more "user-friendly" or more easily read than the first identifiers. For example, in some embodiments, the second identifiers include words that identify operating systems, architectures, or the like, while the first identifiers are alphanumeric sequences that do not contain words.

In some embodiments, the administrator user identifies an additional custom check 1010 (e.g., checks on firewall, anti-virus capability, data encryption, GRC, etc.) to check a condition on the first subset of nodes on linear communication orbit 204, and the condition is not included or covered by any standard benchmark. In an example, the custom check is implemented using either PowerShell or VBScript on a Windows operating system. In another example, the custom check is implemented using bash scripts on a Linux/OS X operating system.

Further, in some embodiments, the administrator user is prompted to select between a single local environment verification action and a plurality of recurring environment verification actions in a scheduling region 1012. When the user selects "recurring," scheduling fields 910, 912, 914 and 916 pop out to enable the administrator user to set up a start time, an end time, a duration and a frequency (or repetition interval) of the first set of local environment verifications from which local results are reported from the first subset of nodes of linear communication orbit 204.

In response to a user click on an affordance 1014 (e.g., "Create & Deploy" 1012), administrator machine 220 issues a second instruction to collect results from the first subset of nodes on linear communication orbit 204. The second instruction includes the information identified in one or more of fields 1002-1012. In response to receiving the second instruction, server 202 injects, into the linear communication orbit 204, a query message to request the one or more local verification results generated from verifications at the first subset of nodes. The query message is forwarded from node to node along the linear communication orbit, and a respective node of the first subset of nodes, in response to receiving the query message through the linear communication orbit, sends respective local results for the one or more verifications that have been obtained at that respective node to the server through the linear communication orbit.

In some embodiments, the second instruction includes one or more custom checks that are to be performed at the first subset of nodes. Server 202 injects, into the linear communication orbit 204, a second query message to request execution of the one or more custom checks at the first subset of nodes. The second query message is forwarded from node to node along the linear communication orbit, and the respective node of the first subset of nodes, in response to receiving the second query message through the linear communication orbit, performs the one or more custom verifications. The respective node furthermore sends respective local results for the one or more custom verifications that have been obtained at said respective node to the server through the linear communication orbit 204. Optionally, the respective local results for the respective node are aggregated with the local results for other nodes on the same linear communication orbit 204 and the aggregated local results are reported to server 202 by a last node, or other identified (or self-identified) node, on linear communication orbit 204. In some embodiments, the local results for the one or more custom checks are locally cached and then collected by a subsequent query message, for example a third query message; in such embodiments, the first subset of nodes, in response to receiving the second query message through the linear communication orbit, perform the one or more custom verifications, but do not send the corresponding results to server 202 until the subsequent query message is received. In another example, local results for the one or more custom verifications are both generated and returned in response to the second query.

Alternatively, in some implementations, the second query message to request execution of the one or more custom checks is not distributed through the linear communication orbit independently, and the corresponding custom verifications are not executed at the respective node independently. Rather, the second query message that requests the custom checks is sent in conjunction with the query message that requests the one or more local verification results generated from the first set of local environment verifications at the first subset of nodes. Each of the first subset of nodes goes through the benchmark(s) selected in benchmark field 1006 first, and then iterates through the custom checks that are identified in the second query message (e.g., in custom check 1010). The results of the custom checks are returned together with the results of the first set of local environment verifications.

Figure 10B:
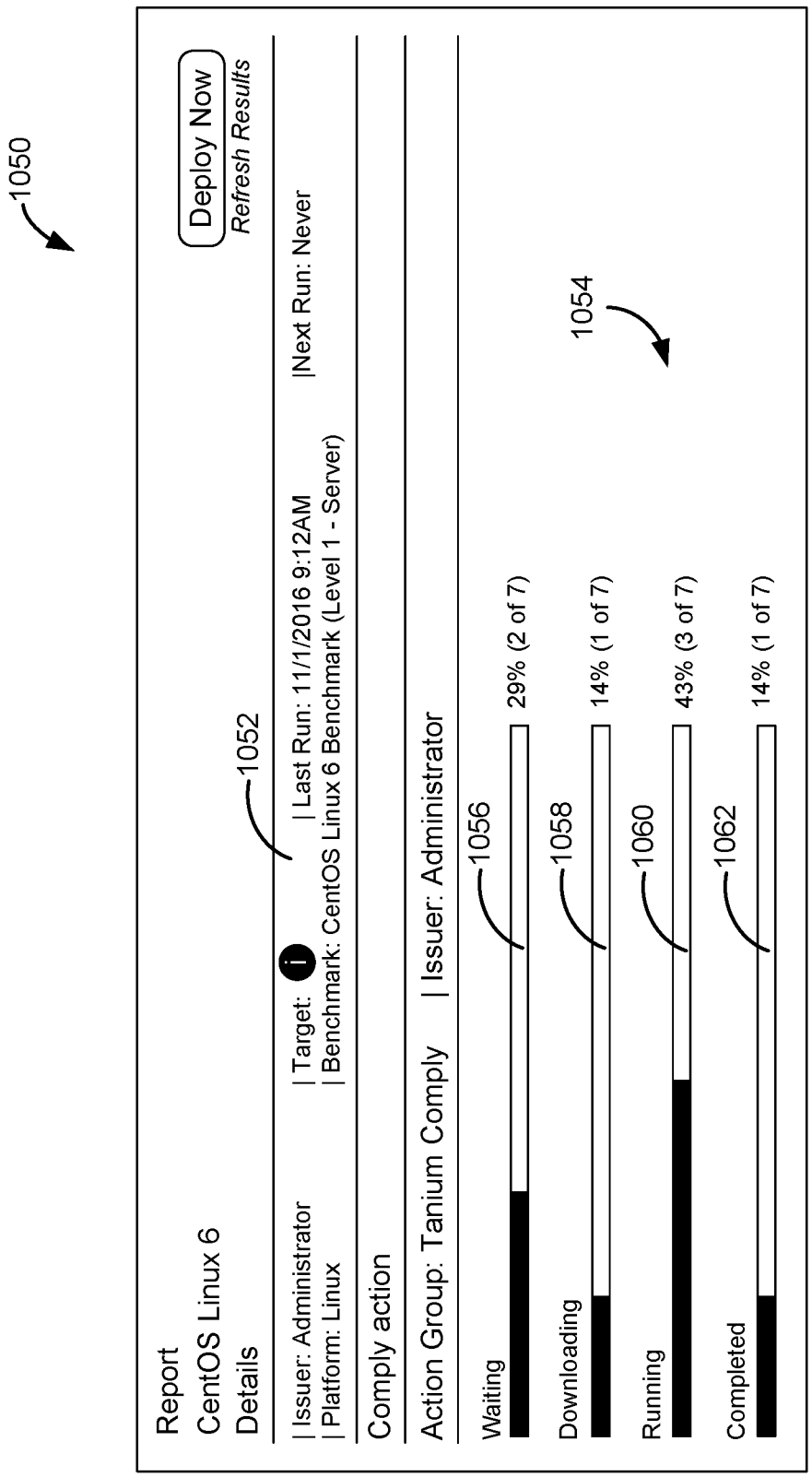
FIG. 10B is an example user interface displayed on an administrator machine for presenting verification status information associated with a query message of collecting local verification results in accordance with some embodiments.

FIG. 10B is an example user interface (UI) 1050 displayed on an administrator machine 220 for presenting verification status associated with a query message of collecting local verification results in accordance with some embodiments. UI 1050 is optionally displayed after server 202 injects, into the linearly ordered communication orbit, a query message to collect local results from the first subset of nodes on linear communication orbit 204. UI 1050 includes regions 1052 and 1054. Region 1052 provides an overview of the corresponding local environment verification actions, e.g., information of the administrator user, request time, platform and benchmark. Region 1054 shows the progress of the first set of local environment verifications at the first subset of nodes on linear communication orbit 204. In this example, two out of seven nodes wait to execute the identified local environment verifications (1056); one out seven nodes is downloading a verification request that requests the first set of local environment verifications at the first subset of nodes while the requested verifications have not been executed (1058); two of seven nodes are currently running the verifications (1060); one out of seven nodes has completed the verification and delivered the results (1062).

Figure 10C:
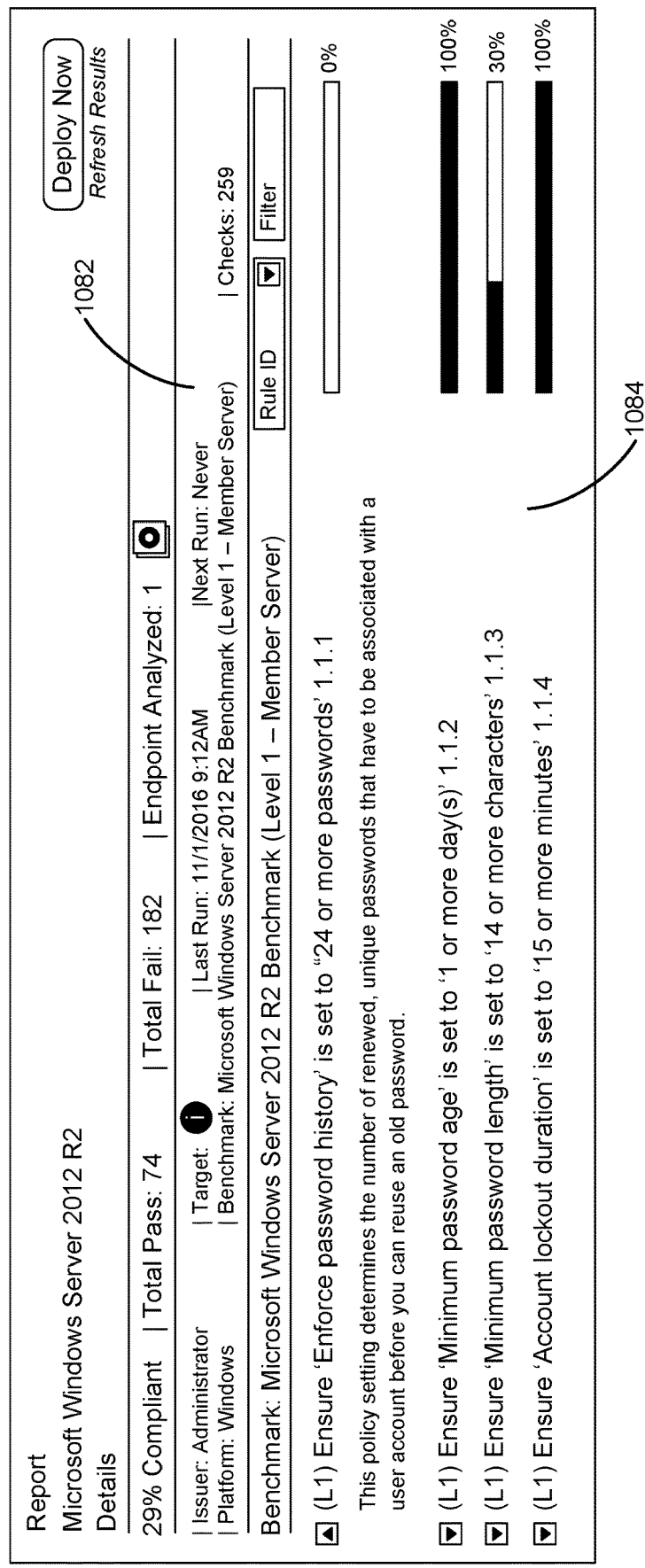
FIG. 10C is an example user interface displayed on an administrator machine for presenting local environment verification results associated with configuration compliance of computer nodes of a linear communication orbit in accordance with some embodiments.
Figure 11A:
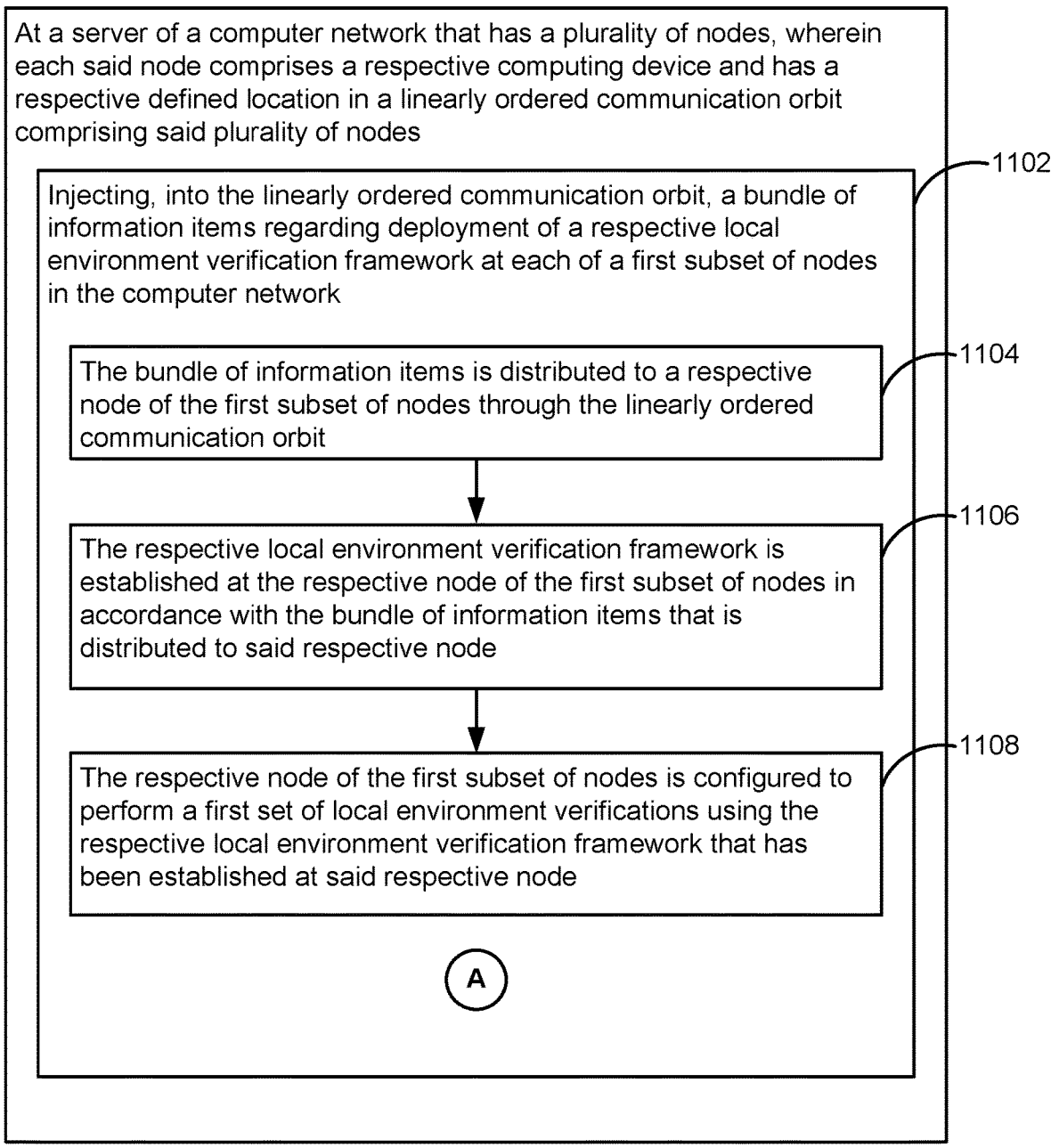
Figure 11D:
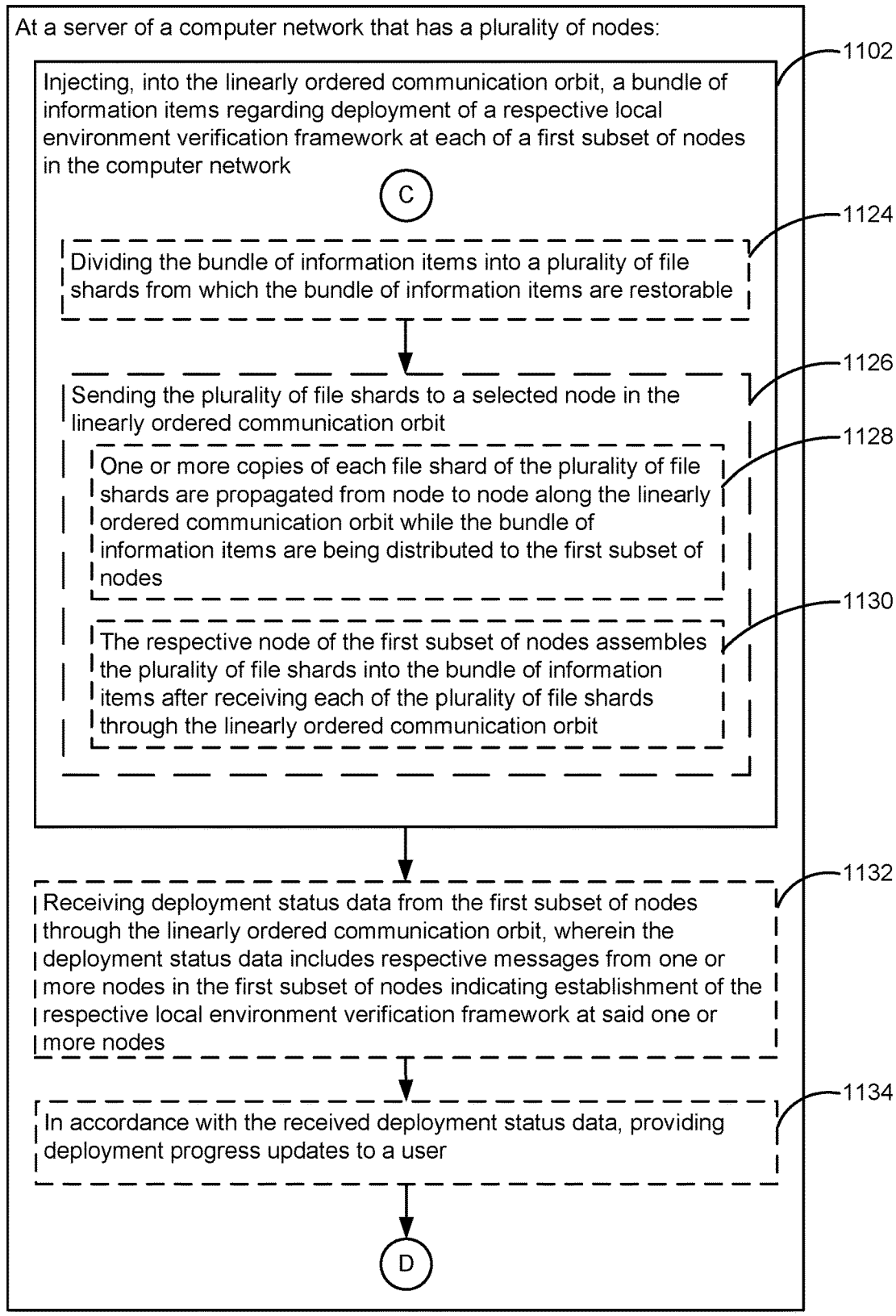
Figure 11E:
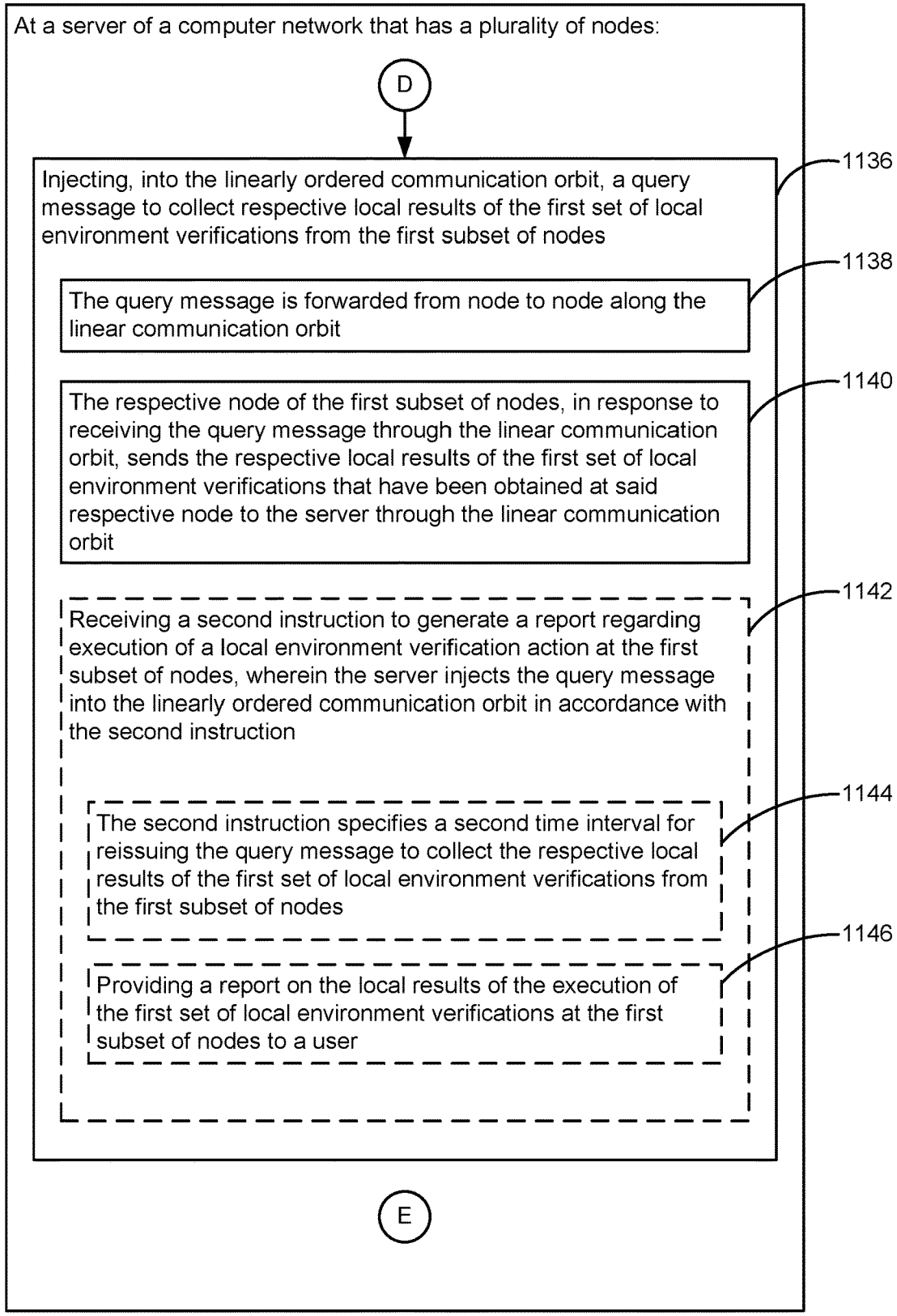

FIG. 10C is an example user interface (UI) 1080 displayed on an administrator machine for presenting local environment verification results associated with configuration compliance of computer nodes of a linear communication orbit in accordance with some embodiments. UI 1080 is displayed after server 202 injects, into the linearly ordered communication orbit, a query message to collect local results from the first subset of nodes on linear communication orbit 204, and the local environment verification results are delivered to server 202. In this example, the local environment verification results are obtained from a configuration compliance framework deployed to identify security compliance at the first subset of nodes on linear communication orbit 204. UI 1080 includes regions 1082 and 1084. Region 1082 provides an overview of the corresponding local environment verification actions, e.g., information of an administrator user, request time, platform and benchmark. Region 1084 shows the local environment verification results collected from the first subset of nodes on linear communication orbit 204. In this example UI 1080, region 1084 includes a result item directed to "Ensure 'Minimum password length' is set to '14 or more characters' 1.1.3." It is indicated that only 30% of the first subset of nodes comply with this requirement.

In some embodiments, upon identifying security incompliance at one or more nodes, the administrator user may request a third instruction to issue a remedial action command to each of the one or more nodes of the first subset of nodes. Server 202 receives the third instruction, and sends the remedial action command to the respective node of the first subset of nodes through the linearly ordered communication orbit. For example, a message is displayed to a user of one of the other 70% of the first subset of nodes to request the user to change a password thereby ensuring that a corresponding minimum password length is set to 14 or more characters.

FIGS. 11A-11G include a flow diagram representing a method 1100 for verifying the local environments of nodes in a computer network in accordance with some embodiments. Method 1100 is, optionally, governed by instructions that are stored in a non-transitory computer readable storage medium and that are executed by one or more processors of a computational machine (e.g., server 202). Each of the operations shown in FIGS. 11A-11G may correspond to instructions stored in a computer memory or non-transitory computer readable storage medium (e.g., memory 804b of server 202 in FIG. 8B). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

It is noted that some of the features or operations of method 1100 described below have been described in more detail above, and those descriptions are to be considered to be part of the description of method 1100, where applicable.

Method 1100 is performed by a server of a computer network that has a plurality of nodes. Each node of the computer network includes a respective computational device and has a respective defined location in a linearly ordered communication orbit (also called "linear communication orbit") including the plurality of nodes. The server of the computer network injects (1102), into the linearly ordered communication orbit, a bundle of information items regarding deployment of a respective local environment verification framework at each of a first subset of nodes in the computer network. In some embodiments, the server identifies the first subset of nodes in the computer network according to one or more characteristics (e.g., what operating system is run at the first subset of nodes) for dynamically identifying the first subset of nodes. In some embodiments, the local environment verification framework includes a compliance verification framework and/or vulnerability detection framework. In some embodiments, the local environment verification framework includes one or more of a Java runtime environment, a compliance verification engine, a set of compliance benchmarks, and/or vulnerability checks that are to be executed at the first subset of nodes of the computer network.

The bundle of information items is distributed (1104) to a respective node of the first subset of nodes through the linearly ordered communication orbit. The respective local environment verification framework is established (1106) at the respective node of the first subset of nodes in accordance with the bundle of information items that is distributed to said respective node. The respective node of the first subset of nodes is configured to perform (1108) a first set of local environment verifications using the respective local environment verification framework that has been established at said respective node. In some embodiments, the first set of local environment verifications are configured to be performed in batches, executed one at a time at specified or predefined time intervals, to avoid overstressing the respective node of the first subset of nodes. For example, the first set of local environment verifications includes 2000 checks, and 500 checks are performed at a time.

In some embodiments, the bundle of information items regarding deployment of the respective local environment verification framework includes (1110) a plurality of compliance benchmarks and an engine for executing the plurality of compliance benchmarks. Examples of the compliance benchmarks include, but are not limited to, those provided by CIS, NIST and DISA. The compliance benchmarks are configured to meet one or more regulatory requirements imposed by one or more of PCI DSS, FISMA, ISO/IEC 27002, GLBA, SOX and HIPAA. More details on the compliance benchmarks are explained above with reference to FIGS. 1 and 2.

In some embodiments, the method 1100 further includes (1112), prior to injecting a query message (see 1136, discussed below), sending a verification request to perform the first set of local environment verifications at the first subset of nodes. The verification request includes (1112) one or more parameters for performing the first set of local environment verifications at the first subset of nodes. To be specific, the one or more parameters include (1114) one or more of: a selection of the first set of local environment verifications from a full set of local environment verifications included in the bundle of information items, a schedule by which the first set of local environment verifications is to be executed at the first subset of nodes, a time interval during which the first set of local environment verifications is to be completed at the first subset of nodes, and a batch size (e.g., 500 checks) for running the first set of local environment verifications at a time. For example, the first set of local environment verifications includes a user-selected subset of benchmarks or vulnerability checks, and the full set of local environment verifications include an entire CIS-CAT benchmark bundle and all checks from an Open Vulnerability Assessment Language (OVAL) definition file. Additional details and examples of the one or more parameters used for performing the first set of local environment verifications are explained above with reference to FIGS. 9A and 9B.

In some embodiments, the server receives (1116) a first instruction to deploy a local environment verification action to implement the first set of local environment verifications at the first subset of nodes. The server assembles the bundle of information items injected into the linearly ordered communication orbit. Optionally, the first instruction specifies (1118) a first time interval during which to distribute the bundle of information items to the first subset of nodes. Optionally, the first instruction specifies (1120) a second time interval for re-deploying the respective local environment verification framework at each of the first subset of nodes. In some embodiments, the first instruction specifies (1122) one or more characteristics (e.g., what operating system is run at the first subset of nodes) for dynamically identifying the first subset of nodes, and the respective node of the subset of nodes self-identifies as belonging to the first subset of nodes based on the one or more characteristics.

In some embodiments, the server injects the bundle of information items into the linearly ordered communication orbit by dividing (1124) the bundle of information items into a plurality of file shards from which the bundle of information items are restorable, and sending (1126) the plurality of file shards to a selected node (e.g., a head node) in the linearly ordered communication orbit. In some situations, one or more copies of each file shard of the plurality of file shards are propagated (1128) from node to node along the linearly ordered communication orbit while the bundle of information items are being distributed to the first subset of nodes. In some embodiments, the respective node of the first subset of nodes assembles (1130) the plurality of file shards into the bundle of information items after receiving each of the plurality of file shards through the linearly ordered communication orbit. More details on collecting the file shards of the bundle of information items are explained above with reference to FIGS. 4-6.

In some embodiments, the server receives (1132) deployment status data from the first subset of nodes through the linearly ordered communication orbit. The deployment status data includes respective messages from one or more nodes in the first subset of nodes indicating establishment of the respective local environment verification framework at said one or more nodes. In accordance with the received deployment status data, the server provides (1134) deployment progress updates to a user.

The server injects (1136), into the linearly ordered communication orbit, a query message (e.g., query message 702) to collect respective local results of the first set of local environment verifications from the first subset of nodes. The query message is forwarded (1138) from node to node along the linear communication orbit. In response to receiving the query message through the linear communication orbit, the respective node of the first subset of nodes sends (1142) the respective local results of the first set of local environment verifications that have been obtained at said respective node to the server through the linear communication orbit.

In some embodiments, the server receives (1142) a second instruction to generate a report regarding execution of a local environment verification action at the first subset of nodes. The server injects the query message into the linearly ordered communication orbit in accordance with the second instruction. Further, in some embodiments, the second instruction specifies (1144) a second time interval for reissuing the query message to collect the respective local results of the first set of local environment verifications from the first subset of nodes. Optionally, the server generates and provides (1146) a report on the local results of the execution of the first set of local environment verifications at the first subset of nodes to a user.

In some embodiments, the second instruction includes (1148) one or more custom verifications that are to be performed at the first subset of nodes. The server injects (1150) into the linearly ordered communication orbit, a second query message to request execution of the one or more custom verifications at the first subset of nodes. The second query message is forwarded (1152) from node to node along the linear communication orbit. In response to receiving the second query message through the linear communication orbit the respective node of the first subset of nodes performs (1154) the one or more custom verifications. The respective node furthermore sends respective local results for the one or more custom verifications that have been obtained at said respective node to the server through the linear communication orbit. In some embodiments, the respective node stores the local results for the one or more custom verifications as cached results, and sends the local results for the one or more custom verifications in response to a subsequent query. In another example, in which the execution time for the custom verifications is very short (e.g., less than predefined threshold, such as 0.1 seconds), local results for the one or more custom verifications are both generated and returned in response to the second query.

In some embodiments, the bundle of information items includes (1156) a plurality of rules of the local environment verification framework, and the second instruction includes an identifier mapping that maps first identifiers of the plurality of rules to second identifiers of the plurality of rules. The server generates a first report (1158) that includes the first identifiers of the plurality of rules, and a second report (1160) that includes the second identifiers of the plurality of rules.

In some circumstances, after receiving the local verification results, the server receives (1162) a third instruction to issue a remedial action command to the respective node of the first subset of nodes. The server then sends (1164) the remedial action command to the respective node of the first subset of nodes through the linearly ordered communication orbit.

More details on collecting local verification results from the linear communication orbit are explained above with reference to FIGS. 2, 3A-3B and 7.

In some embodiments, the server receives (1166) verification status data from the first subset of nodes through the linearly ordered communication orbit. The verification status data includes respective messages from one or more nodes in the first subset of nodes indicating completion status of the first set of local environment verifications at said one or more nodes. In accordance with the received verification status data, the server provides (1168) action progress updates to a user. Optionally, the verification status data are collected using individual status messages from the first subset of nodes, or by status collection messages (i.e., aggregated status messages) that pick up verification status information from all nodes (or all live nodes) in various specified subsets of nodes (e.g., the first subset of nodes) on one or more linear communication orbits, or alternatively, by status collection messages that pick up verification status information from all live nodes on one or more linear communication orbits. In some situations, the action progress updates reflect latest verification status, and are regarded as real-time updates of the verification status.

In some embodiments, the server receives (1170) an instruction to collect recent results for the first set of local environment verifications from the first subset of nodes. In response to receiving the instruction to collect the recent results, the server sends (1172) a third query message along the linearly ordered communication orbit to collect the recent results from the first subset of nodes. In accordance with a determination that cached results for the first set of local environment verifications meet predefined age criteria, the respective node of the first subset of nodes sends (1174) the cached results to the server through the linearly ordered communication orbit. In accordance with a determination that the cached results for the first set of local environment verifications do not meet the predefined age criteria, the respective node of the first subset of nodes optionally aborts reporting the cached results of the first set of local environment verifications to server 202, or reports the cached results (e.g., the most recent results) to server 202 through linear communication orbit 204 regardless of whether the cached results meet the predefined age criteria.

It should be understood that the particular order in which the operations in FIGS. 11A-11G have been described is merely an example and is not intended to indicate that the described order is the only order in which the operations could be performed. One of ordinary skill in the art would recognize various ways to verify local environment for computational machines coupled at respective nodes of a linear communication orbit as described herein.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method, including:
at a server system in a computer network that has a plurality of nodes, wherein each said node comprises a respective computational device and has a respective defined location in a linearly ordered communication orbit comprising said plurality of nodes:
  injecting, into the linearly ordered communication orbit, a bundle of information items regarding deployment of a respective local environment verification framework at each of a first subset of nodes in the computer network, wherein:
    the bundle of information items is distributed to a respective node of the first subset of nodes through the linearly ordered communication orbit,
    the respective local environment verification framework is established at the respective node of the first subset of nodes in accordance with the bundle of information items that is distributed to said respective node; and
    the respective node of the first subset of nodes is configured to perform a first set of local environment verifications using the respective local environment verification framework that has been established at said respective node;
  injecting, into the linearly ordered communication orbit, a query message to collect respective local results of the first set of local environment verifications from the first subset of nodes, wherein:
    the query message is forwarded from node to node along the linearly ordered communication orbit, and
    the respective node of the first subset of nodes, in response to receiving the query message through the linearly ordered communication orbit, sends the respective local results of the first set of local environment verifications that have been obtained at said respective node to the server system through the linearly ordered communication orbit.

2. The method of claim 1, wherein the bundle of information items regarding deployment of the respective local environment verification framework includes a plurality of compliance benchmarks and an engine for executing the plurality of compliance benchmarks.

3. The method of claim 1, further comprising, prior to injecting the query message, sending a verification request to perform the first set of local environment verifications at the first subset of nodes, wherein the verification request includes one or more parameters for performing the first set of local environment verifications at the first subset of nodes.

4. The method of claim 3, wherein the one or more parameters include one or more of:
a selection of the first set of local environment verifications from a full set of local environment verifications included in the bundle of information items,
a schedule by which the first set of local environment verifications is to be executed at the first subset of nodes,
a time interval during which the first set of local environment verifications is to be completed at the first subset of nodes, and
a batch size for running the first set of local environment verifications at a time.

5. The method of claim 1, including:
receiving a first instruction to deploy a local environment verification action to implement the first set of local environment verifications at the first subset of nodes, wherein the server system assembles the bundle of information items injected into the linearly ordered communication orbit.

6. The method of claim 5, wherein the first instruction specifies a first time interval during which to distribute the bundle of information items to the first subset of nodes.

7. The method of claim 5, wherein the first instruction specifies a second time interval for re-deploying the respective local environment verification framework at each of the first subset of nodes.

8. The method of claim 5, wherein the first instruction specifies one or more characteristics for dynamically identifying the first subset of nodes, and wherein the respective node of the first subset of nodes self-identifies as belonging to the first subset of nodes based on the one or more characteristics.

9. The method of claim 1, wherein injecting the bundle of information items into the linearly ordered communication orbit includes:

dividing the bundle of information items into a plurality of file shards from which the bundle of information items are restorable; and sending the plurality of file shards to a selected node in the linearly ordered communication orbit.

10. The method of claim 9, wherein one or more copies of each file shard of the plurality of file shards are propagated from node to node along the linearly ordered communication orbit while the bundle of information items are being distributed to the first subset of nodes.

11. The method of claim 9, wherein the respective node of the first subset of nodes assembles the plurality of file shards into the bundle of information items after receiving each of the plurality of file shards through the linearly ordered communication orbit.

12. The method of claim 1, including:
receiving deployment status data from the first subset of nodes through the linearly ordered communication orbit, wherein the deployment status data includes respective messages from one or more nodes in the first subset of nodes indicating establishment of the respective local environment verification framework at said one or more nodes; and in accordance with the received deployment status data, providing deployment progress updates to a user.

13. The method of claim 1, including:
receiving a second instruction to generate a report regarding execution of a local environment verification action at the first subset of nodes, wherein the server system injects the query message into the linearly ordered communication orbit in accordance with the second instruction.

14. The method of claim 13, wherein the second instruction specifies a second time interval for reissuing the query message to collect the respective local results of the first set of local environment verifications from the first subset of nodes.

15. The method of claim 13, including:
providing to a user a report on local results of the first set of local environment verifications at the first subset of nodes.

16. The method of claim 15, including:
receiving a third instruction to issue a remedial action command to the respective node of the first subset of nodes; and sending the remedial action command to the respective node of the first subset of nodes through the linearly ordered communication orbit.

17. The method of claim 13, wherein:
the second instruction includes one or more custom verifications that are to be performed at the first subset of nodes; and
the method includes:
injecting, into the linearly ordered communication orbit, a second query message to request execution of the one or more custom verifications at the first subset of nodes;
forwarding the second query message from node to node along the linearly ordered communication orbit;
performing, at the respective node of the first subset of nodes, in response to receiving the second query message through the linearly ordered communication orbit, the one or more custom verifications; and
sending respective local results for the one or more custom verifications that have been obtained at said respective node to the server system through the linearly ordered communication orbit.

18. The method of claim 13, wherein the bundle of information items includes a plurality of rules of the respective local environment verification framework, and the second instruction includes an identifier mapping that maps first identifiers of the plurality of rules to second identifiers of the plurality of rules.

19. The method of claim 18, including:
generating a first report that includes the first identifiers of the plurality of rules of the respective local environment verification framework; and
generating a second report that includes the second identifiers of the plurality of rules of the respective local environment verification framework.

20. The method of claim 1, including:
receiving verification status data from the first subset of nodes through the linearly ordered communication orbit, wherein the verification status data includes respective messages from one or more nodes in the first subset of nodes indicating completion status of the first set of local environment verifications at said one or more nodes; and in accordance with the received verification status data, providing action progress updates to a user.

21. The method of claim 1, including:
receiving an instruction to collect recent results for the first set of local environment verifications from the first subset of nodes; and in response to receiving the instruction to collect the recent results, sending a third query message along the linearly ordered communication orbit to collect the recent results from the first subset of nodes, wherein:
in accordance with a determination that cached results for the first set of local environment verifications meet predefined age criteria, the respective node of the first subset of nodes sends the cached results to the server system through the linearly ordered communication orbit.

22. A server system in a computer network that has a plurality of nodes, wherein each said node comprises a respective computational device and has a respective defined location in a linearly ordered communication orbit comprising said plurality of nodes, the server system comprising:
one or more processors; and
memory having instructions stored thereon, which when executed by the one or more processors cause the server system to perform operations including:
injecting, into the linearly ordered communication orbit, a bundle of information items regarding deployment of a respective local environment verification framework at each of a first subset of nodes in the computer network, wherein:
the bundle of information items is distributed to a respective node of the first subset of nodes through the linearly ordered communication orbit,
the respective local environment verification framework is established at the respective node of the first subset of nodes in accordance with the bundle of information items that is distributed to said respective node; and
the respective node of the first subset of nodes is configured to perform a first set of local environment verifications using the respective local environment verification framework that has been established at said respective node;

injecting, into the linearly ordered communication orbit, a query message to collect respective local results of the first set of local environment verifications from the first subset of nodes, wherein:
the query message is forwarded from node to node along the linearly ordered communication orbit, and
the respective node of the first subset of nodes, in response to receiving the query message through the linearly ordered communication orbit, sends the respective local results of the first set of local environment verifications that have been obtained at said respective node to the server system through the linearly ordered communication orbit.

23. A non-transitory computer-readable medium, having instructions stored thereon, which when executed by one or more processors of a server system of a computer network that has a plurality of nodes, wherein each said node comprises a respective computational device and has a respective defined location in a linearly ordered communication orbit comprising said plurality of nodes, cause the server system to perform operations including:
injecting, into the linearly ordered communication orbit, a bundle of information items regarding deployment of a respective local environment verification framework at each of a first subset of nodes in the computer network, wherein:
the bundle of information items is distributed to a respective node of the first subset of nodes through the linearly ordered communication orbit,
the respective local environment verification framework is established at the respective node of the first subset of nodes in accordance with the bundle of information items that is distributed to said respective node; and
the respective node of the first subset of nodes is configured to perform a first set of local environment verifications using the respective local environment verification framework that has been established at said respective node;
injecting, into the linearly ordered communication orbit, a query message to collect respective local results of the first set of local environment verifications from the first subset of nodes, wherein:
the query message is forwarded from node to node along the linearly ordered communication orbit, and
the respective node of the first subset of nodes, in response to receiving the query message through the linearly ordered communication orbit, sends the respective local results of the first set of local environment verifications that have been obtained at said respective node to the server system through the linearly ordered communication orbit.

24. The server system of claim 22, wherein the bundle of information items regarding deployment of the respective local environment verification framework includes a plurality of compliance benchmarks and an engine for executing the plurality of compliance benchmarks.

25. The server system of claim 22, wherein the instructions stored in memory include instructions, which when executed by the one or more processors cause the server system to perform operations including, prior to injecting the query message, sending a verification request to perform the first set of local environment verifications at the first subset of nodes, wherein the verification request includes one or more parameters for performing the first set of local environment verifications at the first subset of nodes.

26. The server system of claim 25, wherein the one or more parameters include one or more of:
a selection of the first set of local environment verifications from a full set of local environment verifications included in the bundle of information items,
a schedule by which the first set of local environment verifications is to be executed at the first subset of nodes,
a time interval during which the first set of local environment verifications into be completed at the first subset of nodes, and
a batch size for running the first set of local environment verifications at a time.

27. The server system of claim 22, wherein the instructions stored in memory include instructions, which when executed by the one or more processors cause the server system to perform operations including:
receiving a first instruction to deploy a local environment verification action to implement the first set of local environment verifications at the first subset of nodes, wherein the server system assembles the bundle of information items injected into the linearly ordered communication orbit.

28. The server system of claim 27, wherein the first instruction specifies a first time interval during which to distribute the bundle of information items to the first subset of nodes.

29. The server system of claim 27, wherein the first instruction specifies a second time interval for re-deploying the respective local environment verification framework at each of the first subset of nodes.

30. The server system of claim 27, wherein the first instruction specifies one or more characteristics for dynamically identifying the first subset of nodes, and wherein the respective node of the first subset of nodes self-identifies as belonging to the first subset of nodes based on the one or more characteristics.

31. The server system of claim 22, wherein injecting the bundle of information items into the linearly ordered communication orbit includes:
dividing the bundle of information items into a plurality of file shards from which the bundle of information items are restorable; and
sending the plurality of file shards to a selected node in the linearly ordered communication orbit.

32. The server system of claim 31, wherein one or more copies of each file shard of the plurality of file shards are propagated from node to node along the linearly ordered communication orbit while the bundle of information items are being distributed to the first subset of nodes.

33. The server system of claim 31, wherein the respective node of the first subset of nodes assembles the plurality of file shards into the bundle of information items after receiving each of the plurality of file shards through the linearly ordered communication orbit.

34. The server system of claim 22, wherein the instructions stored in memory include instructions, which when executed by the one or more processors cause the server system to perform operations including:
receiving deployment status data from the first subset of nodes through the linearly ordered communication orbit, wherein the deployment status data includes respective messages from one or more nodes in the first subset of nodes indicating establishment of the respective local environment verification framework at said one or more nodes; and in accordance with the received deployment status data, providing deployment progress updates to a user.

35. The server system of claim 22, wherein the instructions stored in memory include instructions, which when executed by the one or more processors cause the server system to perform operations including:
receiving a second instruction to generate a report regarding execution of a local environment verification action at the first subset of nodes, wherein the server system injects the query message into the linearly ordered communication orbit in accordance with the second instruction.

36. The server system of claim 35, wherein the second instruction specifies a second time interval for reissuing the query message to collect the respective local results of the first set of local environment verifications from the first subset of nodes.

37. The server system of claim 35, wherein the instructions stored in memory include instructions, which when executed by the one or more processors cause the server system to perform operations including:
providing to a user a report on local results of the first set of local environment verifications at the first subset of nodes.

38. The server system of claim 37, wherein the instructions stored in memory include instructions, which when executed by the one or more processors cause the server system to perform operations including:
receiving a third instruction to issue a remedial action command to the respective node of the first subset of nodes; and
sending the remedial action command to the respective node of the first subset of nodes through the linearly ordered communication orbit.

39. The server system of claim 35, wherein:
the second instruction includes one or more custom verifications that are to be performed at the first subset of nodes; and
the instructions stored in memory include instructions, which when executed by the one or more processors cause the server system to perform operations including:
injecting, into the linearly ordered communication orbit, a second query message to request execution of the one or more custom verifications at the first subset of nodes;
forwarding the second query message from node to node along the linearly ordered communication orbit;
performing, at the respective node of the first subset of nodes, in response to receiving the second query message through the linearly ordered communication orbit, the one or more custom verifications; and
sending respective local results for the one or more custom verifications that have been obtained at said respective node to the server system through the linearly ordered communication orbit.

40. The server system of claim 35, wherein the bundle of information items includes a plurality of rules of the respective local environment verification framework, and the second instruction includes an identifier mapping that maps first identifiers of the plurality of rules to second identifiers of the plurality of rules.

41. The server system of claim 40, wherein the instructions stored in memory include instructions, which when executed by the one or more processors cause the server system to perform operations including:
generating a first report that includes the first identifiers of the plurality of rules of the respective local environment verification framework; and
generating a second report that includes the second identifiers of the plurality of rules of the respective local environment verification framework.

42. The server system of claim 22, wherein the instructions stored in memory include instructions, which when executed by the one or more processors cause the server system to perform operations including:
receiving verification status data from the first subset of nodes through the linearly ordered communication orbit, wherein the verification status data includes respective messages from one or more nodes in the first subset of nodes indicating completion status of the first set of local environment verifications at said one or more nodes; and
in accordance with the received verification status data, providing action progress updates to a user.

43. The server system of claim 22, wherein the instructions stored in memory include instructions, which when executed by the one or more processors cause the server system to perform operations including:
receiving an instruction to collect recent results for the first set of local environment verifications from the first subset of nodes; and
in response to receiving the instruction to collect the recent results, sending a third query message along the linearly ordered communication orbit to collect the recent results from the first subset of nodes, wherein:
in accordance with a determination that cached results for the first set of local environment verifications meet predefined age criteria, the respective node of the first subset of nodes sends the cached results to the server system through the linearly ordered communication orbit.

44. The non-transitory computer-readable medium of claim 23, wherein the bundle of information items regarding deployment of the respective local environment verification framework includes a plurality of compliance benchmarks and an engine for executing the plurality of compliance benchmarks.

45. The non-transitory computer-readable medium of claim 23, further including instructions, which when executed by the one or more processors cause the server system to perform operations including, prior to injecting the query message, sending a verification request to perform the first set of local environment verifications at the first subset of nodes, wherein the verification request includes one or more parameters for performing the first set of local environment verifications at the first subset of nodes.

46. The non-transitory computer-readable medium of claim 45, wherein the one or more parameters include one or more of:
a selection of the first set of local environment verifications from a full set of local environment verifications included in the bundle of information items,
a schedule by which the first set of local environment verifications is to be executed at the first subset of nodes,
a time interval during which the first set of local environment verifications is to be completed at the first subset of nodes, and
a batch size for running the first set of local environment verifications at a time.

47. The non-transitory computer-readable medium of claim 23, further including instructions, which when executed by the one or more processors cause the server system to perform operations including:
receiving a first instruction to deploy a local environment verification action to implement the first set of local environment verifications at the first subset of nodes, wherein the server system assembles the bundle of information items injected into the linearly ordered communication orbit.

48. The non-transitory computer-readable medium of claim 47, wherein the first instruction specifies a first time interval during which to distribute the bundle of information items to the first subset of nodes.

49. The non-transitory computer-readable medium of claim 47, wherein the first instruction specifies a second time interval for re-deploying the respective local environment verification framework at each of the first subset of nodes.

50. The non-transitory computer-readable medium of claim 47, wherein the first instruction specifies one or more characteristics for dynamically identifying the first subset of nodes, and wherein the respective node of the first subset of nodes self-identifies as belonging to the first subset of nodes based on the one or more characteristics.

51. The non-transitory computer-readable medium of claim 23, wherein injecting the bundle of information items into the linearly ordered communication orbit includes:
dividing the bundle of information items into a plurality of file shards from which the bundle of information items are restorable; and
sending the plurality of file shards to a selected node in the linearly ordered communication orbit.

52. The non-transitory computer-readable medium of claim 51, wherein one or more copies of each file shard of the plurality of file shards are propagated from node to node along the linearly ordered communication orbit while the bundle of information items are being distributed to the first subset of nodes.

53. The non-transitory computer-readable medium of claim 51, wherein the respective node of the first subset of nodes assembles the plurality of file shards into the bundle of information items after receiving each of the plurality of file shards through the linearly ordered communication orbit.

54. The non-transitory computer-readable medium of claim 23, further including instructions, which when executed by the one or more processors cause the server system to perform operations including:
receiving deployment status data from the first subset of nodes through the linearly ordered communication orbit, wherein the deployment status data includes respective messages from one or more nodes in the first subset of nodes indicating establishment of the respective local environment verification framework at said one or more nodes; and
in accordance with the received deployment status data, providing deployment progress updates to a user.

55. The non-transitory computer-readable medium of claim 23, further including instructions, which when executed by the one or more processors cause the server system to perform operations including:
receiving a second instruction to generate a report regarding execution of a local environment verification action at the first subset of nodes, wherein the server system injects the query message into the linearly ordered communication orbit in accordance with the second instruction.

56. The non-transitory computer-readable medium of claim 55, wherein the second instruction specifies a second time interval for reissuing the query message to collect the respective local results of the first set of local environment verifications from the first subset of nodes.

57. The non-transitory computer-readable medium of claim 55, further including instructions, which when executed by the one or more processors cause the server system to perform operations including:
providing to a user a report on local results of the first set of local environment verifications at the first subset of nodes.

58. The non-transitory computer-readable medium of claim 57, further including instructions, which when executed by the one or more processors cause the server system to perform operations including:
receiving a third instruction to issue a remedial action command to the respective node of the first subset of nodes; and
sending the remedial action command to the respective node of the first subset of nodes through the linearly ordered communication orbit.

59. The non-transitory computer-readable medium of claim 55, wherein:
the second instruction includes one or more custom verifications that are to be performed at the first subset of nodes; and
further including instructions, which when executed by the one or more processors cause the server system to perform operations including:
injecting, into the linearly ordered communication orbit, a second query message to request execution of the one or more custom verifications at the first subset of nodes;
forwarding the second query message from node to node along the linearly ordered communication orbit;
performing, at the respective node of the first subset of nodes, in response to receiving the second query message through the linearly ordered communication orbit, the one or more custom verifications; and
sending respective local results for the one or more custom verifications that have been obtained at said respective node to the server system through the linearly ordered communication orbit.

60. The non-transitory computer-readable medium of claim 55, wherein the bundle of information items includes a plurality of rules of the respective local environment verification framework, and the second instruction includes an identifier mapping that maps first identifiers of the plurality of rules to second identifiers of the plurality of rules.

61. The non-transitory computer-readable medium of claim 60, further including instructions, which when executed by the one or more processors cause the server system to perform operations including:
generating a first report that includes the first identifiers of the plurality of rules of the respective local environment verification framework; and
generating a second report that includes the second identifiers of the plurality of rules of the respective local environment verification framework.

62. The non-transitory computer-readable medium of claim 23, further including instructions, which when executed by the one or more processors cause the server system to perform operations including:
receiving verification status data from the first subset of nodes through the linearly ordered communication orbit, wherein the verification status data includes respective messages from one or more nodes in the first subset of nodes indicating completion status of the first set of local environment verifications at said one or more nodes; and in accordance with the received verification status data, providing action progress updates to a user.

63. The non-transitory computer-readable medium of claim 23, further including instructions, which when executed by the one or more processors cause the server system to perform operations including:

receiving an instruction to collect recent results for the first set of local environment verifications from the first subset of nodes; and in response to receiving the instruction to collect the recent results, sending a third query message along the linearly ordered communication orbit to collect the recent results from the first subset of nodes, wherein:

in accordance with a determination that cached results for the first set of local environment verifications meet predefined age criteria, the respective node of the first subset of nodes sends the cached results to the server system through the linearly ordered communication orbit.

\* \* \* \* \*